US008168897B2

(12) United States Patent
Südkamp

(10) Patent No.: US 8,168,897 B2
(45) Date of Patent: May 1, 2012

(54) WEIGHING CONVEYOR FOR TRANSPORTING SHOCK SENSITIVE PRODUCTS AT A VARIABLE FEED RATE

(75) Inventor: Heinz Südkamp, Dinklage (DE)

(73) Assignee: Big Dutchman International GmbH, Vechta (DE)

( * ) Notice: Subject to any disclaimer, the term of this patent is extended or adjusted under 35 U.S.C. 154(b) by 424 days.

(21) Appl. No.: 12/225,537

(22) PCT Filed: Mar. 23, 2007

(86) PCT No.: PCT/EP2007/002584
§ 371 (c)(1),
(2), (4) Date: Aug. 3, 2009

(87) PCT Pub. No.: WO2007/110201
PCT Pub. Date: Oct. 4, 2007

(65) Prior Publication Data
US 2009/0294248 A1  Dec. 3, 2009

(30) Foreign Application Priority Data
Mar. 24, 2006 (DE) .......................... 20 2006 004 894

(51) Int. Cl.
*B65G 43/08* (2006.01)
*B65G 49/05* (2006.01)
*G01G 19/00* (2006.01)
*A01K 43/08* (2006.01)
*A01K 31/16* (2006.01)

(52) U.S. Cl. .......... 177/16; 198/571; 198/437; 198/444; 198/358; 209/513; 119/337; 119/440; 222/77; 177/119; 177/145

(58) Field of Classification Search .......... 198/571–573, 198/437, 444, 358; 209/513; 119/337, 338, 119/440; 177/119–122, 16, 17, 145; 222/55, 222/56, 77, 64
See application file for complete search history.

(56) References Cited

U.S. PATENT DOCUMENTS

| 3,139,065 | A | * | 6/1964 | Willauer, Jr. ............... 119/337 |
| 3,145,793 | A | * | 8/1964 | Ray .................................. 177/8 |
| 3,427,929 | A |   | 2/1969 | Dawson |

(Continued)

FOREIGN PATENT DOCUMENTS

DE  3332240 C2  6/1897

(Continued)

OTHER PUBLICATIONS

Non-English Translation of Communication from European Patent Office, mailed on Jan. 20, 2011 (7 pages).

(Continued)

*Primary Examiner* — Randy W Gibson
(74) *Attorney, Agent, or Firm* — Price Heneveld LLP

(57) ABSTRACT

A conveyor for shock-sensitive products includes a conveyor member with at least one intermediate storage region adapted to receive a predetermined number of the products placed thereon when the conveyor is a static condition for temporary intermediate storage. A force measuring member determines the weight force of the products in the intermediate storage region. A control member, adapted to increase and decrease the rate of feed of the shock-sensitive products in the conveyor member, processes the weight force detected by the force measuring member as an input parameter, and increases or reduces the rate of feed of the products toward and away from the intermediate storage region as a function of the weight force.

54 Claims, 7 Drawing Sheets

U.S. PATENT DOCUMENTS

| | | | | |
|---|---|---|---|---|
| 3,696,584 | A | * | 10/1972 | Rickard ..................... 53/239 |
| 3,738,077 | A | | 6/1973 | Leach |
| 3,759,368 | A | * | 9/1973 | Rose et al. ................. 198/437 |
| 3,968,904 | A | * | 7/1976 | Neville ........................ 222/25 |
| 4,086,998 | A | | 5/1978 | van der Schoot |
| RE29,944 | E | * | 3/1979 | Hyer et al. ................. 177/121 |
| 4,226,211 | A | | 10/1980 | Barrentine |
| 4,418,773 | A | * | 12/1983 | Finet et al. ................... 177/16 |
| 4,542,808 | A | | 9/1985 | Lloyd, Jr. et al. |
| 5,046,570 | A | | 9/1991 | Emme et al. |
| 5,119,893 | A | * | 6/1992 | Jost ................................. 177/16 |
| 5,304,745 | A | | 4/1994 | Rusk et al. |
| 5,551,822 | A | | 9/1996 | Pippin et al. |
| 5,736,682 | A | * | 4/1998 | Heitmann et al. ............ 177/16 |
| 6,211,470 | B1 | * | 4/2001 | Beran et al. ................... 177/16 |
| 2004/0112713 | A1 | | 6/2004 | Haan et al. |

FOREIGN PATENT DOCUMENTS

| | | |
|---|---|---|
| DE | 1406150 | 3/1969 |
| DE | 2155120 | 3/1972 |
| DE | 2313663 | 10/1974 |
| DE | 3326706 A1 | 2/1984 |
| DE | 3607858 A1 | 9/1987 |
| DE | 3138748 C2 | 11/1991 |
| DE | 19807231 A1 | 9/1999 |
| DE | 19906916 A1 | 8/2000 |
| FR | 2322809 | 4/1977 |
| GB | 1406164 | 4/1973 |
| GB | 2047649 A | 12/1980 |

OTHER PUBLICATIONS

English language abstracts for DE 3332240, DE 3138748 A, DE 19906916, and DE 332670 (2 pages).

German Patent Publication No. GB 1021571, "Bunker Discharge Apparatus," Mar. 2, 1966, Maschinenfabrik Buckau R. Wolf Aktiengesellschaft (3 pages).

U.S. Patent No. 6,328,154 B1, "Freight Loading System," Dec. 11, 2001, Thomas Huber (10 pages).

* cited by examiner

WEIGHING CONVEYOR FOR TRANSPORTING SHOCK SENSITIVE PRODUCTS AT A VARIABLE FEED RATE

BACKGROUND OF THE INVENTION

The invention concerns a conveyor arrangement for shock-sensitive products, such as eggs or the like, and includes a conveyor apparatus for conveying the products, an intermediate storage region which is adapted to receive products temporarily by virtue of discontinuous feed or discharge, and a control device for increasing the discharge and/or for reducing the feed of products into the intermediate storage region of the conveyor apparatus when a predetermined critical number of products is exceeded in the intermediate storage region.

Conveyor arrangements are generally used for transporting eggs away from a laying area and feeding them to a packaging station. That purpose is served by using particular conveyor arrangements which include a transverse conveyor belt which conveys products to a processing station and a plurality of longitudinal conveyor belts which are so arranged that they convey products from various, mutually spaced locations onto the transverse conveyor belt. In such devices, the longitudinal conveyor belts extend along a row of henhouses or aviaries and are generally provided individually for each level or tier. The transverse conveyor belts are typically mounted at a right angle to the longitudinal conveyor belts which are disposed in a parallel relationship, and receive the eggs which are transported by the longitudinal conveyor belts out of the laying areas.

A first problem arising with such prior conveyor arrangements is that conveyance of the eggs on the longitudinal conveyor belts, which extends over a period of time, causes the feed of the eggs by way of the transverse conveyor belt to the processing station to be discontinuous, and in an amount which is insufficient to make full use of the processing capacity of the processing station. To avoid this problem, it is known for a plurality of longitudinal conveyor belts to be simultaneously activated to supply the transverse conveyor belt with an adequate amount of eggs. A problem with that procedure, however, is that the spaced points of entry of the longitudinal conveyor belts mean that the transverse conveyor belt cannot be filled uniformly, and the transverse conveyor belt capacities are exceeded locally, which usually leads to damage to the eggs.

A further problem with such prior conveyor arrangements is that only low egg conveyor rates are achieved at both the beginning of the conveyor cycle or operation, and at the end of the cycle, since an excessively low level of supply to the transverse conveyor belt occurs by virtue of starting up the first longitudinal conveyor belt and allowing the last longitudinal conveyor belt to run down. That increases or prolongs the processing time at the processing station, which is disadvantageous for cost reasons.

Particularly in relatively large henhouse installations, it is often desirable for the eggs to be collected in batches or groups from given locations, for example because certain henhouses involve the administration of a different feed from other henhouses, and the eggs produced in that way are to be supplied as an interrelated assembly to the processing station in order to be jointly processed, for example packaged. It is in precisely such situations where the egg collecting operation, with for example up to 15 different groups, takes place in succession. However, it is not possible to achieve full utilization of the processing capacity of the processing station at all times with the previously known measures of simultaneously switching on different longitudinal conveyor belts so that, in such situations of use, considerably longer operating times in the processing station and consequently longer collecting times and higher operating costs have to be tolerated.

A further problem with such prior conveyor arrangements involves in particular keeping laying hens in an aviary in animal-friendly conditions. In such a situation, the animals are provided with a nest in which the animals preferably lay their eggs. The eggs roll onto the longitudinal conveyor belt from the nest. However, the locally concentrated accumulation of the laid eggs results in overfilling of the longitudinal conveyor belt in the nest region, and that can lead to damage to the eggs. In contrast, keeping the hens in cages leads to the laid eggs being distributed over the entire cage width, and consequently, one-off or sequential activation of the longitudinal conveyor belts per day would be sufficient to collect the laid eggs, it being necessary when keeping the birds in animal-friendly aviaries for the collecting operation to be carried out a number of times daily by virtue of local overfilling of the longitudinal conveyor belts.

Yet a further problem with such prior conveyor arrangements is that a build-up can occur due to congestion or processing problems upstream of or in the processing station, and as a result, high damaging forces can act on the eggs. To avoid that problem, it is known to provide a limit switch which is actuated by the egg collection, and which switches off the transverse conveyor belt when an inadmissibly high force occurs. However, from the point of view of utilizing the full capacity of the processing station, a certain build-up or accumulation upstream of the processing station is desired as a buffer, switching off the transverse conveyor belt in that way results in the transverse conveyor belt being very frequently switched on and off, and that can cause increased wear and premature failure.

Finally, a further problem with known conveyor apparatuses is that, when supplying products from a plurality of conveyor belts to a common collecting conveyor belt, damage to the products often occurs if the additionally supplied products first have to displace the products which are already on the collecting conveyor belt, and in that case, unacceptably high forces are operative between the products. To avoid such damage, it is known to provide product guide devices which are stationarily fixed in position relative to the movement of the collecting conveyor belt, and which guide the products already on the collecting conveyor belt upstream of the entry regions of further products in such a way that they are guided away from the entry region and space is thus made available for the products which are additionally arriving. Those product guide devices have to be regularly repositioned and set to accommodate changing delivery conditions, either due to delivery from different delivery conveyor belts or due to varying delivery conveyor quotas, and that makes handling thereof more difficult.

SUMMARY OF THE INVENTION

One object of the present invention is to provide a conveyor arrangement which avoids one, and preferably a plurality, of the aforementioned problems.

In accordance with one aspect of the invention, a force measuring device is provided which is adapted and arranged to detect a force which is exerted by the products disposed in an intermediate storage region, and which represents a measurement of the number of products in the intermediate storage region, and a control device adapted to process the force detected by the force measuring device as an input parameter, and to increase or reduce the discharge and/or feed of the products from/to the intermediate storage region in accordance with the force value.

The invention makes it possible for the first time to achieve differentiated actuation of the discharging and feeding conveyor apparatuses, in accordance with the force responsible for damage to the products. In that way, the filling of the intermediate storage region that is sought to be achieved, for example to supply a processing station or to receive products from a product region, can be effected in a very much more specific and targeted fashion, and it is thus possible to achieve an intermediate storage region filling effect, without the frequent starting and stopping of the conveyor apparatus as is required in the state of the art.

In that embodiment, it is particularly preferred that the control device is adapted to actuate the conveyor apparatus at a first and a second conveyor speed, wherein the second speed is higher than the first speed. In that way, it is possible to select a suitable speed depending upon on the force measurement value in order to increase or reduce the number of products in the intermediate storage region. Thus, upon a reduction in the detected force, the second speed can be selected while upon an increase in the detected force, the first speed can be selected. Furthermore, the first and second speeds can be set when the force values fall below or exceed predetermined force limit values.

It is further preferred that the control device is adapted to adjust the conveyor apparatus preferably steplessly in accordance with the force detected by the force measuring device. Stepless control of the conveyor apparatus allows highly precise regulation of the number of products in the intermediate storage region or the force occurring between the products.

It is further preferred that the control device is adapted to reduce the feed of products to the intermediate storage region and/or to increase the discharge from the intermediate storage region when a predetermined force value is exceeded. That provides for simple and reliable control or regulation of product conveyance.

In a particularly preferred embodiment of the conveyor arrangement, the force measuring device is arranged beneath the products in the intermediate storage region in order to measure in a vertical direction and to detect the total or cumulative force due to weight of the products in the intermediate storage region. This arrangement is particularly suitable for use in the region of a nest when animals are being kept in an aviary situation. In that respect, the force measuring device can be so arranged that it measures the force due to weight of the eggs on the longitudinal belt in the region of the nest, and causes a conveying movement on the part of the longitudinal conveyor belt when a predetermined force due to weight is exceeded in order to prevent a build-up of the eggs.

In that embodiment, it is particularly preferred that the force measuring device is coupled to a horizontally arranged weighing plate arranged beneath a conveyor belt on which the products are arranged in the intermediate storage region. Weighing of all the products in the intermediate storage region is thus achieved in a reliable and structurally robust fashion.

In particular, it is preferable that the control device is adapted to actuate the conveyor apparatus from a stopped condition when a predetermined cumulative force due to weight of the products in the intermediate storage region is exceeded, so that the products are further conveyed to such an extent that all products are conveyed out of the intermediate storage region. In that way, a conveying action, partial or complete, is implemented in accordance with the products in the intermediate storage region, and it is possible to avoid a build-up.

It is particularly preferred that the conveyor apparatus includes a conveyor belt on which the intermediate storage region extends by a given length, and the control device is adapted so that the conveyor belt is further conveyed by precisely the length of the intermediate storage region when a predetermined cumulative force caused by the weight of the products in the intermediate storage region is exceeded. That arrangement provides that, upon complete filling of the intermediate storage region, the conveyor belt is advanced, only to such an extent that the subsequent filling of the conveyor belt occurs in a region directly adjoining or adjacent to the previously filled region, and in that way, complete filling of the longitudinal conveyor belt is progressively achieved over a large region.

Thus, in one aspect of the conveyor arrangement, a plurality of mutually spaced intermediate storage regions are arranged along the conveyor belt, and the control device is so adapted that when a predetermined cumulative force caused by the weight of the products is first exceeded in an intermediate storage region, the conveyor belt is further conveyed by the length of the intermediate storage means. When a predetermined cumulative force due to the weight of the products is subsequently exceeded in the intermediate storage region, the conveyor belt is conveyed further once again by the length of the intermediate storage means, and that procedure is optionally repeated up to a predetermined number of repetitions until the conveyor belt is full. The conveyor belt is then driven until the products are conveyed from the conveyor belt onto a second conveyor apparatus or into a storage space.

In this embodiment, when using the conveyor arrangement as a longitudinal conveyor belt, a multiple advance movement of the longitudinal conveyor belt is effected in a stepwise fashion over a discrete advance distance which corresponds to the length of the intermediate storage region. In that way, adjacent regions on the longitudinal conveyor belt are filled in succession over time. A plurality of nest regions are usually arranged along the longitudinal conveyor belt, and then after a given number of such discrete advance movements, a longitudinal conveyor belt portion, which is filled up by an adjacent nest region, would be conveyed into the nest region of a juxtaposed aviary, and in that case, there would be the danger of a build-up of eggs occurring, as there is no longer any free longitudinal conveyor belt region available. Therefore, when the longitudinal conveyor belt is typically completely filled, continuous activation of the longitudinal conveyor belt is implemented in order to convey the eggs toward a storage space, for example onto a transverse conveyor belt.

A further development of the conveyor arrangement includes providing a plurality of conveyor belts, each having at least one respective intermediate storage region, arranged so that at least one intermediate storage region includes a force sensor for measuring the force due to the weight of the products in the intermediate storage region, and the control device is so adapted that all conveyor belts are further conveyed by the length of the intermediate storage means when a predetermined cumulative force due to the weight of the products in that intermediate storage region is exceeded. That arrangement is suitable in particular for a plurality of henhouses, and is based on the realization that typically each aviary has a similar laying capacity, so that it is sufficient if the laid eggs are weighed only in the region of the nest of one aviary, and then all conveyor belts are advanced when a given force or weight value in that region is exceeded.

A further aspect of that arrangement includes providing a plurality of conveyor belts, each having at least one respective intermediate storage region with a force sensor for measuring the force caused by the weight of the products in the intermediate storage region, and a control device adapted so that all conveyor belts are further conveyed by the length of the intermediate storage means when the force due to the weight of the products in one intermediate storage region with force sensor, or the mean value of the force due to the weight of the products in all intermediate storage regions with force sensor, exceeds a predetermined force due to the weight of the products. With this embodiment, a greater degree of security or precision in relation to irregularities in the laying capacity is achieved, insofar as the laid eggs of a plurality of aviaries are measured, and then all longitudinal conveyor belts are advanced in dependence on those measurement values.

In a second particularly preferred configuration of the conveyor arrangement according to the invention, the force measuring device is coupled to a movable wall portion to detect the horizontal surface pressure exerted by the products on the movable wall portion as a pressing force on the movable portion. This feature is particularly suitable for monitoring the eggs conveyed by the transverse conveyor belt in the region upstream of a packaging station to avoid damage to those eggs if build-ups occur in the packaging station. Detection of a differentiated pressing force allows precise control of the supply of eggs and avoids damage or frequently recurring stopping and starting of the transverse conveyor belt.

In that embodiment, it is particularly preferred that the force measuring device is coupled to a movable wall portion to detect the horizontal surface pressure exerted by the products on the movable wall portion as a pressing force on the movable portion. That feature provides for precise measurement of the pressing force, and thus generates an input parameter which is reliable for the control or regulating action. In that embodiment, it is alternatively possible to provide a plurality of force measuring devices, each having a respective movable wall portion, which for example, can lie laterally and in opposite relationship to the products which are being conveyed therethrough, or which can also be arranged in the form of a measuring island in the flow of products.

A further development in the embodiments with a horizontally measuring force sensor is providing the movable wall portion with a first wall surface region which faces in opposite relationship to the feed conveyor device into the intermediate storage region, and a second wall surface region which faces parallel to the feed conveyor device. It has been found that the provision of two such wall surface regions provides for detection, which is desirable in terms of ascertaining the actual product loading of the conveyor force in the conveyor direction and the transverse force produced thereby with respect to the conveyor direction, which represents an input parameter directly related to the risk of product damage, for the regulating or control action.

In that embodiment, the movable wall portion can be of a half-round shape. Thus, a preferred structure is a half-round wall portion, which is mounted pivotably at one end, and spaced from that mounting is coupled to the force sensor and transmits a force to the sensor.

In accordance with a second aspect of the invention, to avoid the above-discussed disadvantages of known conveyor arrangements, there is proposed a conveyor arrangement, comprising a conveyor apparatus for conveying the products, an intermediate storage region which is adapted to receive products which are to be put temporarily into intermediate storage by virtue of discontinuous feed or discharge, a control device for increasing the discharge and/or for reducing the feed of products into the intermediate storage region of the conveyor apparatus when a predetermined critical number of products is exceeded in the intermediate storage region, wherein the conveyor arrangement is distinguished in that a measuring device is arranged in the intermediate storage region, which is adapted and arranged to detect the number of products standing up in the intermediate storage region, and which represents a measurement of the horizontal force between the products in the intermediate storage region, and the control device is adapted to process the number detected by the measuring device as an input parameter and to increase or reduce the discharge and/or feed of the products from/to the intermediate storage region as a function thereof.

This aspect of the invention represents an alternative for direct measurement of the force in the intermediate storage region, and is based on the realization that the products accumulated in the intermediate storage region, when a given horizontal pressing force among each other is exceeded, have a tendency to stand up or be arranged in a mutually superposed relationship in the intermediate storage region. The number of the products which project in that way beyond the products, which are lying flat on the base surface of the intermediate storage region, whether that occurs by virtue of the products standing up or by virtue of their being supported on an adjacent product, is a measurement of the magnitude of the horizontal forces between the products in the intermediate storage region, and can therefore be used as an input parameter for the control device. That conveyor arrangement is suitable in particular for conveying eggs which typically, when an increased conveyor pressure is involved, tend to stand up, and accordingly afford a reliable indication in the form of a plurality of eggs standing on their rounded ends, when a predetermined critical horizontal force has been exceeded.

In that way, the conveyor arrangement can be used in the same fashion as previously discussed for effecting stepless or dynamic transverse belt regulation, which can be regulated as a function of the number of products which are standing up in the intermediate storage region, in a closed regulating circuit.

The measuring device can be for example in the form of a plurality of light barrier arrangements, which measure horizontally over the products which are lying flat in the intermediate storage region, wherein preferably mutually crossing light paths are used in order to ensure coverage and detection over the area involved.

It is further preferred that the intermediate storage region is arranged in the transfer region between a first feeding conveyor apparatus and a second discharging conveyor apparatus, and the control device is so adapted that when a predetermined pressing force between the products, or the number of products standing up in the intermediate storage region is exceeded, the conveyor rate of the feeding conveyor apparatus is reduced and/or the conveyor rate of the discharging conveyor apparatus is increased.

In that embodiment, the predetermined pressing force, or the number of products which are standing up, is selected for example in dependence on the pressure sensitivity of the products being conveyed, and can be stored in table form for typical conveyed products in a memory of the control device or can be input by the user of the conveyor arrangement by way of an operating unit.

It is further preferred that the conveyor rate of the conveyor apparatus or apparatuses can be altered by a preferably stepless or dynamic alteration in the conveyor speed. A stepless change in the conveyor speed, for example by means of frequency converters and electric drive motors for conveyor belts or bar belt conveyors, makes it possible to achieve particularly precise regulation of the conveyor apparatuses in a closed regulating circuit, and on the one hand, reliably avoids damage to the products, while on the other hand, ensuring that the products are permanently held in readiness in the intermediate storage region.

In accordance with one aspect of the invention, to avoid the above-mentioned disadvantages, there is further proposed a conveyor arrangement comprising a transverse conveyor belt which conveys products to a processing station, and a plurality of longitudinal conveyor belts which are so arranged that they convey products onto the transverse conveyor belt at various, mutually spaced locations, wherein a development of the conveyor arrangement provides a device for detecting the conveyor advance of the transverse conveyor belt, and a regulating device which is coupled to said device, and which is adapted at the beginning of a conveyor operation of the conveyor arrangement to set the longitudinal conveyor belts in operation in time-displaced relationship as a function of the spacing between the entry points onto the transverse conveyor belt, the processing station, and the advance of the transverse conveyor belt.

Such conveyor arrangements are used for example to collect the products from production units which are distributed over a large area, and convey them to a common processing station. For that purpose, there are typically provided a plurality of longitudinal conveyor belts which are arranged parallel, and in displaced relationship with each other, and which meet a common transverse conveyor belt at mutually spaced points and convey the products onto the transverse conveyor belt. A problem with such conveyor arrangements is that in discontinuous operation of the longitudinal conveyor belts, a discontinuous feed of the products to the processing station is also realized. Moreover, due to the spatial arrangement involved, full utilization of the capacity of the processing station, and the conveyor capacity of the transverse conveyor belt, which is typically matched to that capacity of the processing station, is not possible. The aforementioned aspect of the invention remedies that disadvantage, insofar as the conveyor advance of the transverse conveyor belt is detected, for example by means of a synchronizing timing means, and a regulating device is used, which regulates the discontinuous activation of the longitudinal conveyor belts on the basis of the conveyor advance and the arrangement of the points of entry of the longitudinal conveyor belts onto the transverse conveyor belt. That regulation can involve on the one hand, activation of the longitudinal conveyor belts (binary regulation), or regulation of the conveyor speed of the longitudinal conveyor belts. Consequently, it is typically possible to implement time-displaced actuation of the longitudinal conveyor belts in such a fashion that the products are conveyed in a closed front, and make full use of the capacity of the transverse conveyor belt, and consequently the capacity of the processing station is also fully utilized. Also, in a situation involving diminishing conveyance of products from an individual longitudinal conveyor belt, another longitudinal conveyor belt, or the other longitudinal conveyor belts, can be increased in their conveying action in order to compensate for that condition, and to initiate compensation in positionally resolved relationship to the transverse conveyor belt at the location at which the deficit has occurred. The regulation of the conveyor arrangement is proposed in a way that makes it possible for the first time to fully utilize the capacity of the processing station in any operating state, and in that respect, to be able to accommodate interruptions in the transverse conveyor belt, and fluctuations in the conveyor efficiency of the longitudinal conveyor belts into the regulating and control procedures.

In particular, the noted conveyor arrangement can be combined with counting devices for the products, which are arranged at the points of entry of the longitudinal conveyor belts onto the transverse conveyor belt, and which detect and count the products which are delivered from each individual longitudinal conveyor belt. The degree of precision of regulation can be further increased by using or exploiting the numerical data ascertained in that way.

One particularly preferred feature for the above-described conveyor arrangement is to provide that the regulating device is adapted to first set in operation a first longitudinal conveyor belt, which is most remote from the processing station, and to set in operation a second conveyor belt arranged closer to the processing station at a time at which the transverse conveyor belt has advanced to such an extent that the products delivered by the first longitudinal conveyor belt have reached the entry region of the second longitudinal conveyor belt. That feature provides that, after a stoppage of the installation, in particular after the conveyor arrangement has become completely empty, the transverse conveyor belt is loaded from the plurality of longitudinal conveyor belts in such a way as to avoid only isolated products being arranged over a longer transverse conveyor belt portion, but instead providing that a front of loaded-on products involving the full capacity of the processing station is formed on the transverse conveyor belt, whereby full utilization of the processing station can be implemented at a predeterminable moment in time. That is highly advantageous, for example, for collecting eggs from a plurality of different locations which are spaced from each other to feed the eggs to a packaging station in such a way that the packaging station can be operated in a fully utilized condition when the operating personnel start work.

Furthermore, in the aforementioned conveyor arrangements, it is advantageous if at least two groups of longitudinal conveyor belts are provided, and the regulating device is adapted to arrange the products of the longitudinal conveyor belts of a first group on the transverse conveyor belt before the products of the longitudinal conveyor belts of a second group. It is often desirable for conveyor arrangements to be operated in such a way that the products are jointly collected from given regions, in particular a plurality of mutually spaced regions. It is only after that collecting operation is completed that the products are collected from other, mutually spaced regions. In that way, two or more groups of production regions can be defined, from which products are collected sequentially or in succession with respect to time. Ensuring constant or efficient utilization of the capacity of the processing station cannot be achieved precisely when using prior art conveyor arrangements and collection strategies. The conveyor arrangement according to the present invention now makes it possible for the first time also to implement such groupwise collection, and achieve constant or full utilization of the capacity of the processing station, by virtue of regulation of the longitudinal conveyor belts as a function of their point of entry, and the transverse belt advance. As in the case of joint collection and processing of all production regions, operation is based on the principle of feeding the production regions of a group to the transverse conveyor belt by way of the corresponding longitudinal conveyor belts in such a way that a closed front is formed using the full processing capacity, and after complete collection of the group, the next closed front of the next group is formed immediately behind the end of the preceding group, and so forth.

In this embodiment, it is particularly preferred that the regulating device is adapted to actuate first in each group the longitudinal conveyor belt most remote from the processing station. This provides that the groups achieve full levels of utilization of the capacity of the processing station, thereby avoiding longer lagging of the transverse conveyor belt at a low level of utilization of the potential capacity.

It is further preferred that the regulating device is adapted to actuate the longitudinal conveyor belts of the group, with the longitudinal conveyor belt most remote from the processing station as the last group. That has turned out to be advantageous, as otherwise there would be a major gap on the transverse conveyor belt, which would interfere with full utilization of the processing station, in the event one of the front longitudinal conveyor belts in a front group is collected, and following that, the last longitudinal conveyor belt is actuated, whereby the transverse conveyor belt remains product-free over a length corresponding to the distance between the front and last longitudinal conveyor belts. As an alternative thereto, the longitudinal conveyor belt most remote from the processing station in the last group could be activated, and that activation could occur at a predetermined period of time prior to termination of the activation of the last longitudinal conveyor belt of the previous group. In that case, the conveyor end of the previous group is predicted, and the most remote longitudinal conveyor belt can be started in such a way as to avoid a gap forming between the two groups.

Groupwise collection can be further optimized if the regulating device is adapted to determine the moment of stopping the last longitudinal conveyor belt of a group, and activating the first longitudinal conveyor belt of a subsequent group as a function of the spacing between the point of entry of the last longitudinal conveyor belt, and the first longitudinal conveyor belt on the transverse conveyor belt, and the transverse conveyor belt advance. With this feature, it is possible for the regulating device to leave between two groups a defined—positive or negative—spacing, by stopping and starting of the corresponding longitudinal conveyor belts being controlled in such a way that the groups specifically overlap or do not overlap, or are at a given spacing from each other.

In that case, it is particularly preferred that the regulating device is adapted to stop the longitudinal conveyor belts and the transverse conveyor belt when the last product of a group has been conveyed into the processing apparatus. In that way, the regulating device affords the possibility of implementing conversion at the processing station, in order to process products of different groups in different ways. In that respect, the last product of a group, or the first product of a following group, can be referred to as a criterion for initiating stopping of the transverse conveyor belt.

It is further preferred that the regulating device is adapted to determine the number of times the last products of the last longitudinal conveyor belt of the first group, and the first products of the first longitudinal conveyor belt of the second group, are deposited on the transverse conveyor belt in a joint mixed region. That produces a mixed region, which for example, contains products of different quality levels, and in the processing of which it is therefore necessary to accept that products of a higher quality level are sorted into a packaging which is classified with a lower quality level. With this feature, it is possible to achieve the advantage that the capacity of the processing station is fully utilized without interruption, and a fluent change takes place between the products in the first and second groups. In that case, the mixed region is treated in the processing station like the group with the products of the lower quality, and accordingly prior to or after the beginning of the mixed region, conversion of the processing mode is effected at the processing station, depending on whether the products are worse or better from one group to another in terms of their quality.

Finally, it is also preferred that, in the groupwise collection of the products, the regulating device is adapted to determine the number of times the longitudinal conveyor belts of the successive groups are started and stopped in such a way to form an intermediate space on the transverse conveyor belt between the products of the first group and the second group. In that way, a period of time for conversion of the processing station can be afforded without interrupting the conveyor procedure.

The conveyor arrangement according to one aspect of the invention can be designed so that the regulating device is adapted to activate so many longitudinal conveyor belts and/or to regulate the conveyor speed of the activated longitudinal conveyor belts in such a way that so many products are fed to each region of the transverse conveyor belt that a predetermined capacity of the processing station is achieved. In that way, full utilization of the capacity of the processing station is achieved by activation and/or speed regulation of the longitudinal conveyor belts, at any moment in time.

It is further preferred that the regulating device is adapted to allocate a fraction of the transverse conveyor belt width to each activated longitudinal conveyor belt, and to regulate the conveyor speed of each longitudinal conveyor belt in such a way that the respectively allocated width of the transverse conveyor belt is filled up with products by the respective longitudinal conveyor belt. That allocation means that each individual longitudinal conveyor belt can be regulated with respect to the conveyor capacity in such a way that the fraction of the transverse conveyor belt width that is allocated thereto is fully utilized. That makes it possible for longitudinal conveyor belts, which are to be emptied in a particularly rapid manner, to be provided with a large fraction of the transverse conveyor belt width, and therefore to preferably collect products therefrom. Also, longitudinal conveyor belts, which are collected over a longer period of time, provide only a small fraction of the transverse conveyor belt width and implement correspondingly slower collection.

In particular, in that respect, it is preferable that each longitudinal conveyor belt pre-stores a given number of products, and the regulating device is coupled to sensors for detecting the products still stored on each longitudinal conveyor belt, and is adapted to allocate to a longitudinal conveyor belt with few products, a smaller fraction of the transverse conveyor belt width than is allocated to a longitudinal conveyor belt with more products so that emptying of all longitudinal conveyor belts is finished or terminated at the same time, or in a time-displaced relationship by a given amount. This development of the invention provides that, besides full utilization of the capacity of the processing station from the beginning of the conveyor operation, which is possible with the conveyor arrangement according to the invention, the arrangement also provides for full utilization of the processing station up to the end of the conveyor operation. The sensors for detecting the products still stored on each longitudinal conveyor belt can, in a simple version, comprise travel sensors, which detect the conveyor belt advance of the longitudinal conveyor belt. An improved version is achieved by additionally ascertaining the product density on the longitudinal conveyor belt, for example by counting the products at the discharge. Particularly, if sensors for detecting the force due to the weight of the products of the above-described kind are installed, it is possible to infer the total eggs disposed on the longitudinal conveyor belt, from the measured weights.

A typical problem with prior conveyor arrangements is that the longitudinal conveyor belts have different amounts of products in readiness, and as a result, the longitudinal conveyor belts which have more products in readiness than others must still lag behind after termination of the conveyor operation of all other longitudinal conveyor belts. As a result, only a small amount of products is delivered onto the transverse conveyor belt from the individual longitudinal conveyor belt which is still continuing to convey products. Because of that small amount, the processing station cannot be utilized to its full capacity over a prolonged period of time. That causes time-intensive rectification at the processing station. With the development according to the present invention, it is possible for a large fraction of the transverse conveyor belt width to be allocated to such longitudinal conveyor belts, whereby the longitudinal conveyor belts with a larger number of products can be emptied as quickly as the other longitudinal conveyor belts. In that respect, the regulating device according to the present invention permits dynamic regulation of the respectively allocated transverse conveyor belt widths, that is to say, as soon as a greater transverse conveyor belt width is allocated to a longitudinal conveyor belt which is entirely filled, the transverse conveyor belt width of the other longitudinal conveyor belts is dynamically reduced to such a degree that in total the proportion attributed to the one longitudinal conveyor belt is attained. The aim of modified regulation of this kind is to operate the processing station at full capacity up to the end of the processing operation, and avoid the processing station lagging behind for isolated subsequently delivered products, at a low level of utilization of its capacity. For that purpose, it will typically be necessary to stop the longitudinal conveyor belts in a time-displaced relationship, as the longitudinal conveyor belts which are closest to the processing station have to be stopped last, and the most remote longitudinal conveyor belt has to be stopped first in order to achieve the desired abrupt termination of product accumulation on the transverse conveyor belt.

It is particularly preferred that the regulating device is coupled to a force sensor arranged at the exit region of the transverse force conveyor belt or a counting sensor of the above-described kind and is adapted to regulate the conveyor speed of the transverse conveyor belt as a function of the sensor signal.

Implementation of such a force sensor, in particular in conjunction with the conveyor arrangement according to one aspect of the present invention with a regulating device, permits reliable, comfortable and convenient regulation, as the variation in the conveyor speed of the transverse conveyor belt that is caused by virtue of the force sensor, is incorporated into the regulation action in the form of the transverse conveyor belt advance, and can thus be taken into consideration. In other words, for the first time it is possible with the conveyor arrangement according to one aspect of the invention to achieve full utilization of the processing station at any time in the conveyor operation, and to avoid repeated starting and stopping of the transverse conveyor belt, insofar as stepless regulation of the transverse conveyor belt is effected, and at the same time, the width of the transverse conveyor belt is completely filled up with products from the longitudinal conveyor belts at any time and at any location on the transverse conveyor belt.

Finally, a further development of the conveyor arrangement according to one aspect of the invention provides a display device, which is coupled to the regulating device to obtain from the regulating device signals for positionally resolved representation of the number of products on the transverse conveyor belt. The subject display device makes it possible for a user or operator of the conveyor arrangement to recognize full utilization of the individual conveyor belt lines and the processing station at a glance, and if necessary, modify and optimize the regulating procedures by means of parameter selection.

In accordance with a further aspect of the invention, there is proposed a conveyor arrangement comprising a transverse conveyor belt and a plurality of longitudinal conveyor belts leading onto the transverse conveyor belt, with at least one movable product guide device which is arranged above the transverse conveyor belt, and which is coupled to an actuator, wherein the actuator can move the product guide device into at least two positions at the support region of the transverse conveyor belt. The product guide device is laterally placed on the transverse conveyor belt in such a way that it guides the products on the transverse conveyor belt away from the entry region of at least one longitudinal conveyor belt. With this conveyor arrangement, it is possible to avoid a collision between products which are already on the transverse conveyor belt and products which are arriving from the longitudinal conveyor belt. The actuator can be actuated electrically, pneumatically, hydraulically or in another fashion. The product guide device can be a pivotably mounted plate.

In that embodiment, it is particularly preferred that there are a plurality of movable product guide devices, which are respectively arranged upstream of the entry regions of a plurality of longitudinal conveyor belts in the conveyor direction of the transverse conveyor belt. This feature permits variable product guidance in dependence on the conveyor state and the activated longitudinal conveyor belts.

It is further preferred that the actuator of each product guide device is coupled to a central control device, and is actuated as a function of the degree of filling of the transverse conveyor belt as calculated by the control device from supplied products and transverse belt advance upstream of the respective product guide device, in order to guide the products away from the entry region of the longitudinal conveyor belts to the degree permitted by the degree of filling. It is possible in that way to prevent the products from being damaged or laterally pushed away by the transverse conveyor belt. The product guide device can be so set that the maximum possible deflection is achieved, or only a fraction thereof, to achieve a deflection which is precisely sufficient to provide space on the transverse conveyor belt for the products which are still to be added thereto.

In addition, in the situation involving groupwise collection, it is preferable that the actuator of each product guide device is actuated in relation to the collected group. Pre-programmed actuator actuation can be effected in that way, and can be set in a group-dependent relationship when the respective group is collected.

The above-described conveyor arrangement according to one aspect of the invention is preferably used for conveying eggs on a longitudinal conveyor belt on which a plurality of mutually spaced, stationary intermediate storage regions is provided, which are so arranged that they receive the eggs laid in nest regions in cages arranged in a row along the longitudinal belt.

The above-described conveyor arrangement according to one aspect of the invention can further be used for conveying eggs on a transverse conveyor belt in order to convey eggs into an intermediate storage region, which is arranged in the conveyor direction upstream of an installation for further processing, such as a packaging installation.

The conveyor arrangement according to one aspect of the invention is preferably operated with a method of conveying eggs in the region of a henhouse comprising a plurality of cage units, comprising the steps:

a. temporarily storing or collecting the eggs laid in a first nest region of a cage or in a first cage on a first intermediate storage region of a static or stationary conveyor belt, b. measuring the cumulative force due to the weight of the eggs in the first intermediate storage region, c. conveyance of the longitudinal conveyor belt by a predetermined distance, such that a conveyor belt portion which is not occupied with eggs is provided as the first intermediate storage region, d. repetition of steps a to c up to a time at which further conveyance of the longitudinal conveyor belt by the predetermined distance would provide a conveyor belt portion already occupied with eggs due to an adjacent second intermediate storage region of a nest region of an adjacent second cage or a second cage as the first intermediate storage region, and e. further conveyance of the conveyor belt until the eggs deposited thereon have been transferred completely onto a second conveyor belt or into a storage means.

Another preferred method to operate the above-described conveyor arrangement comprises the steps:

a. conveying the eggs on a first conveyor apparatus into an intermediate storage region, b1. measuring the cumulative pressing force exerted by the eggs on a lateral boundary wall portion of the intermediate storage region, or b2. measuring the eggs standing up in the intermediate storage region, c. further conveying the eggs out of the intermediate storage region by means of a second conveyor apparatus, and d. regulating the conveyor speed of the first or second conveyor apparatus in dependence on the measured pressing force or the measured number of eggs standing up.

In accordance with a further aspect the present conveyor arrangement, the same can be operated with a method comprising the steps: conveying products on a transverse conveyor belt to a processing station, and delivering products by means of a plurality of longitudinal conveyor belts onto the transverse conveyor belt at various, mutually spaced locations, wherein the conveyor advance of the transverse conveyor belt is detected, and at the beginning of the conveyor operation, the longitudinal conveyor belts are set in operation in a time-displaced relationship as a function of the spacing between their point of entry onto the transverse conveyor belt and the processing station, and the conveyor advance of the transverse conveyor belt.

It is preferred that the first longitudinal conveyor belt most remote from the processing station is set in operation first, and a second conveyor belt arranged closer to the processing station is set in operation at a time at which the transverse conveyor belt has advanced to such an extent that the products conveyed by the first longitudinal conveyor belt have reached the entry region of the second longitudinal conveyor belt.

It is preferred that before the beginning of the conveyor operation, at least two groups of longitudinal conveyor belts are defined, and the longitudinal conveyor belts of a first group are activated first, and the longitudinal conveyor belts of a second group are activated subsequently.

It is preferred that in each group, the longitudinal conveyor belt furthest away from the processing station is activated first.

It is preferred that the longitudinal conveyor belts of the group with the longitudinal conveyor belt furthest away from the processing station are activated as the last group.

It is preferred that the time of stopping the last longitudinal conveyor belt of a group and activating the first longitudinal conveyor belt of a subsequent group is determined as a function of the spacing between the point of entry of the last longitudinal conveyor belt and the first longitudinal conveyor belt to the transverse conveyor belt, and the transverse conveyor belt advance.

It is preferred that the longitudinal conveyor belts and the transverse conveyor belt are stopped when the last product of a group has been conveyed into the processing apparatus.

It is preferred that the last product of the last longitudinal conveyor belt of the first group and the first products of the first longitudinal conveyor belt of the second group are deposited in a common mixed region on the transverse conveyor belt.

It is preferred that an intermediate space is provided on the transverse conveyor belt between the products of the first group of longitudinal conveyor belts and the products of the second group of longitudinal conveyor belts.

It is preferred that so many longitudinal conveyor belts are activated and/or the conveyor speed of the activated longitudinal conveyor belts is regulated, such that so many products are fed to each region of the transverse conveyor belt that a predetermined capacity of the processing station is attained.

It is preferred that a fraction of the transverse conveyor belt width is allocated to each activated longitudinal conveyor belt, and the conveyor speed of each longitudinal conveyor belt is so regulated that the respectively allocated width of the transverse conveyor belt is filled with products by the respective longitudinal conveyor belt.

It is preferred that each longitudinal conveyor belt pre-stores a given number of products, and the products stored on each longitudinal conveyor belt are detected by sensors, and a smaller fraction of the transverse conveyor belt width is allocated to a longitudinal conveyor belt with fewer products than the longitudinal conveyor belt with more products, in order to achieve termination of emptying of all longitudinal conveyor belts at the same time, or in time-displaced relationship by a given amount.

It is preferred that a force sensor arranged at the discharge region of the transverse conveyor belt measures the pressing force prevailing horizontally between the products at the discharge region, and the conveyor speed of the transverse conveyor belt is regulated in accordance with the force sensor signal.

It is preferred that the conveyor speed of the transverse conveyor belt is reduced if the measured pressing force exceeds a predetermined value.

It is preferred that the conveyor speed of the transverse conveyor belt is increased if the measured pressing force falls below a predetermined value.

It is preferred that the conveyor speed of the longitudinal conveyor belts and/or the transverse conveyor belt is steplessly or dynamically altered or varied.

It is preferred that a processing starting time is input, and activation and conveyor speed of the longitudinal conveyor belts and the transverse conveyor belt are started at a time ascertained as a function of the spacing between the longitudinal conveyor belt entry onto the transverse conveyor belt, and the transverse conveyor belt advance, in order to feed products to the processing station in a predetermined capacity at the start time of the processing station.

The invention can further be implemented using a computer program product for execution on a computer, which is so programmed that it performs the steps required for regulation of the conveyor arrangement according to the invention when it is executed on a computer.

These and other advantages of the invention will be further understood and appreciated by those skilled in the art by reference to the following written specification, claims and appended drawings.

BRIEF DESCRIPTION OF THE DRAWINGS

A preferred embodiment of the invention is described with reference to the Figures in which.

DETAILED DESCRIPTION OF THE PREFERRED EMBODIMENTS

Figure 1:
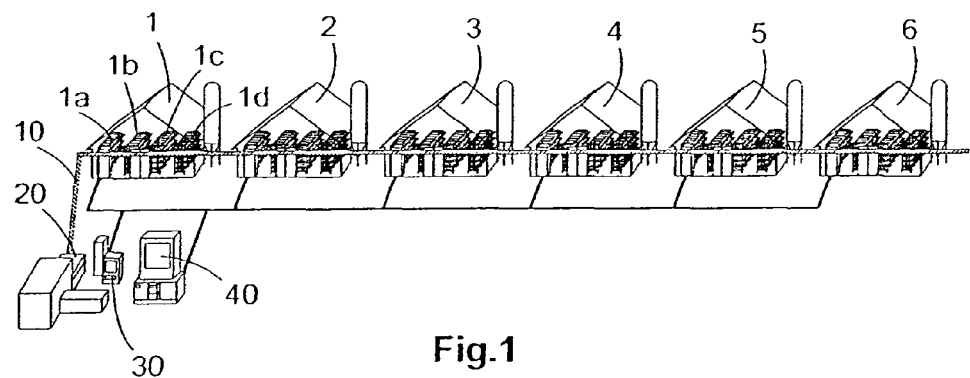
FIG. 1 shows a diagrammatic view of a conveyor arrangement having six henhouse buildings, longitudinal conveyor belts and a transverse conveyor belt.
Figure 1A:
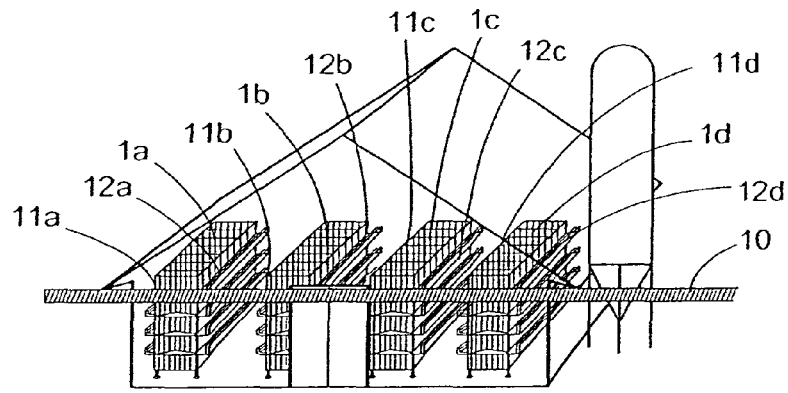
FIG. 1a shows a view on an enlarged scale of an individual henhouse building as shown in FIG. 1.

For purposes of description herein, the terms "upper", "lower", "right", "left", "rear", "front", "vertical", "horizontal" and derivatives thereof shall relate to the invention as oriented in FIGS. 1 and 1a. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows an egg farm with six henhouse buildings 1-6, each of which has four double rows 1a-1d with a plurality of tiers of aviaries or cage systems arranged in rows one behind the other.

The henhouse buildings 1-6 are arranged in mutually juxtaposed relationship in such a way that a transverse conveyor belt 10 can pass in a straight line at the end of the henhouse buildings. The transverse conveyor belt 10 is oriented at a right angle to the rows of aviaries 1a-1d in the region of the henhouse buildings.

As can be clearly seen in particular from FIG. 1a, longitudinal conveyor belts 11a-11d and 12a-12d are arranged in a mutually parallel relationship, and are respectively disposed at each side of the rows of aviaries 1a-1d. Each tier of the rows of aviaries has its own longitudinal conveyor belts so that, for the five tiers of the rows of aviaries as shown in FIGS. 1 and 1a, there are total of ten longitudinal conveyor belts for each row of aviaries, and forty longitudinal conveyor belts for each henhouse building. The longitudinal conveyor belts 11a-11d and 12a-12d of the individual rows of aviaries communicate alternatively with an elevator (not shown) at the end of each row of aviaries, which lifts the eggs out of the ten longitudinal conveyor belts of a row of aviaries onto the transverse conveyor belt 10, or alternatively, the transverse conveyor belt 10 is displaced in height and the five tiers of the rows of aviaries are collected sequentially or in succession with respect to time.

The transverse conveyor belt 10 conveys from right to left in FIGS. 1 and 1a, and opens into a packaging station 20 in which the eggs are packaged.

A central control and regulating unit 30 is connected to peripheral control and regulating units in each henhouse building, and carries out the control and regulating procedures according to the invention for the longitudinal conveyor belts 11a-11d and 12a-12d and the transverse conveyor belt 10.

A central farm control system 40 permits a selection of parameters, as well as visualization of the egg collection procedure and the degree of utilization of the individual conveyor belts.

Figure 2:
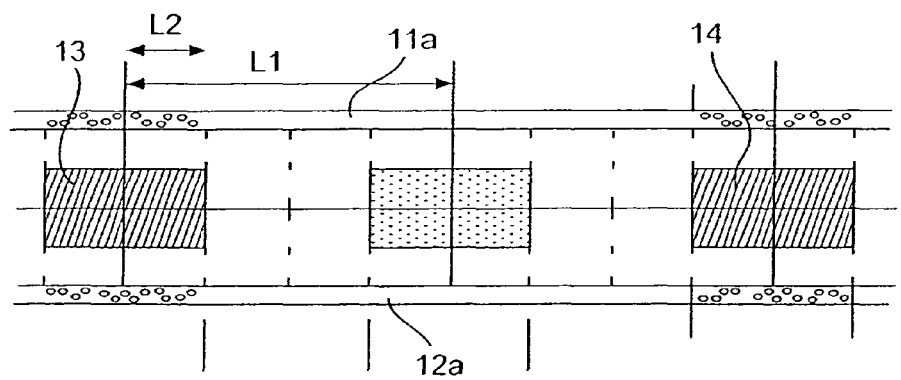
FIG. 2 shows a diagrammatic plan view of the region of a row of henhouses with aviaries arranged in a mutually juxtaposed relationship.

FIG. 2 shows a plan view of a portion of a double row of aviaries with four aviaries in an adjoining relationship to the left and the right, respectively, and two further partially illustrated aviaries. An individual aviary extends over a length L1 of the longitudinal conveyor belts 11a, 12a. A fraction L2 of the length L1 is occupied by a nest region L3 in the aviary. In the region of the length L2, over 90 percent of the eggs are laid by the hens in the aviary, so that the longitudinal conveyor belt 11a is filled in the region L2 in the stopped or static condition in a relatively short period of time during the laying period.

Two nest regions 13 of adjacent aviaries are in a directly adjoining relationship, as can be seen from FIG. 2. Therefore, when the longitudinal conveyor belt in the region of the nest is filled with eggs, the longitudinal conveyor belts 11a, 12a must be advanced at least by double the length L2 in order to move a portion of the conveyor belt which is empty into the nest region 13. As the length L2 in the present example is a quarter of L1, that advance movement on the part of each longitudinal conveyor belt 11a, 12a can be effected three times. On the fourth occasion, the filled region of each longitudinal conveyor belt 11a, 12a would be conveyed out of the nest region 13 into the nest region 14. As in that situation, the longitudinal conveyor belt is therefore full, and the longitudinal conveyor belt must be continuously operated after it has advanced three times by the length 2×L2 until all eggs are conveyed from the longitudinal conveyor belt 11a, 12a onto the transverse conveyor belt 10.

Figure 3:
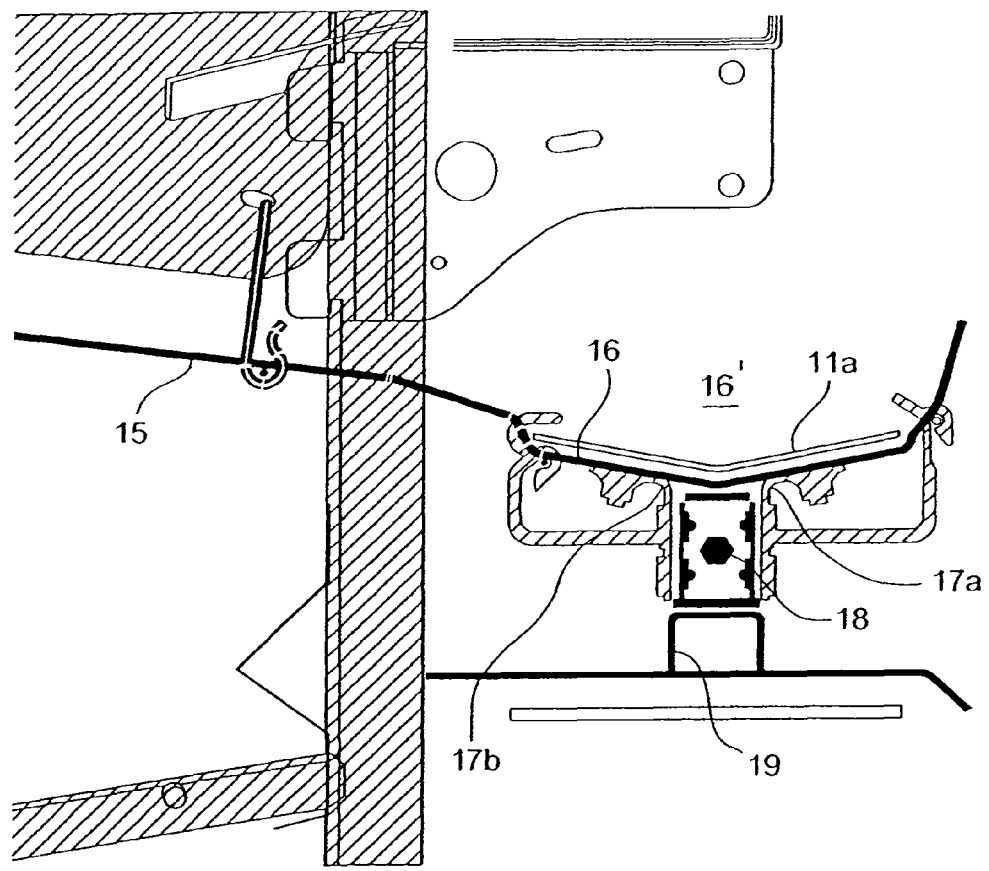
FIG. 3 shows a side view in cross section of the region of the longitudinal conveyor belt and the region of rolling out of a nest of an aviary.

FIG. 3 shows an arrangement of the force sensor according to the invention, which is adapted to control the advance of the longitudinal conveyor belts 11a-11d and 12a-12d as shown as a function of the number of eggs which have rolled from the nest region 13 onto the longitudinal conveyor belt. The eggs roll on an inclined plane 15 out of the nest region 13 to the longitudinal conveyor belt 11a. The upper run of the longitudinal conveyor belt 11a runs above a weighing pan 16 which is coupled to a force sensor 18 by means of two L-shaped members 17a, 17b. The force sensor 18 is fixedly connected to the frame of the aviaries by means of a U-shaped member 19. The force sensor 18 ascertains the weight of the eggs arranged on an intermediate storage region 16' on the conveyor belt 11a above the weighing pan 16.

The force sensor 18 can be in the form of a pressure sensor, but preferably it is in the form of a flexural beam sensor acting at one side, which represents a robust structure, which at the same time is also reliable.

The procedure involved in the conveyor method of the arrangement shown in FIG. 3 is as follows. The eggs roll on the inclined plane 15 to a stop wire outside the aviary frame (not shown). The stop wire slows down the eggs and thus prevents those eggs from colliding with eggs which are already lying on the longitudinal conveyor belt 11a, and it is cyclically lifted to allow the eggs to pass through onto the conveyor belt 11a at a low speed. The greater the number of eggs on the conveyor belt 11a in the region above the weighing pan 16, the correspondingly greater weight is detected by the force sensor 18. Upon the attainment of a given limit value, which on the basis of an average egg weight, indicates complete filling of the longitudinal conveyor belt 11a in the region of the nest, the longitudinal conveyor belt is advanced by double the magnitude of the nest length in order to move an empty region of the longitudinal conveyor belt 11a into the nest region 13. That procedure is repeated three times, and on the fourth occasion, complete collection of the eggs from the longitudinal conveyor belt 11a is implemented by the longitudinal conveyor belt being operated until it has covered at least a total lengthwise extent of the conveyor belt (that is to say half the length of the conveyor belt) and all eggs have been conveyed onto the transverse conveyor belt 10.

Figure 4A:
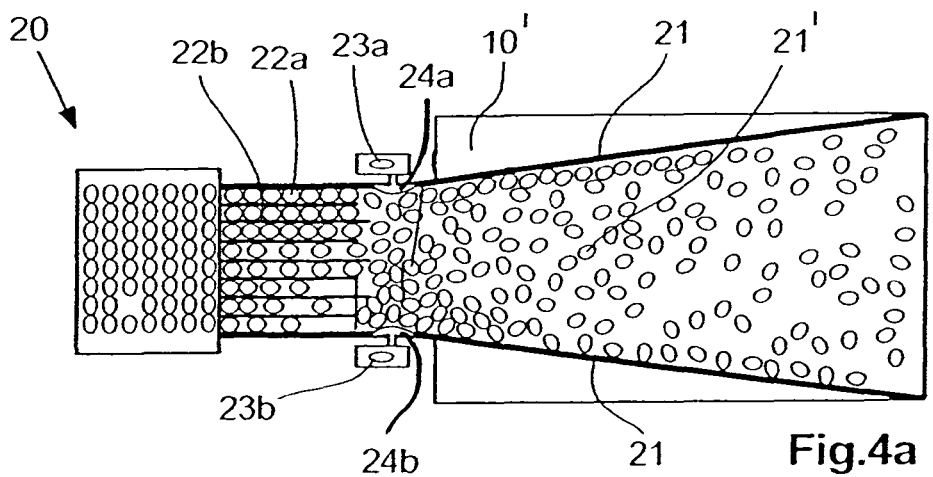
FIG. 4a shows a first embodiment of the entry region of a transverse conveyor belt into a packer with a force pickup device.

FIG. 4a shows another embodiment of the force sensor according to the invention in the entry region to a packaging station 20. The eggs are passed to the packaging station 20 by one or more transverse conveyor belts 10 by way of a funnel table 10', and are brought together to the width of the packaging station 20 on the table by means of wall guide elements 21. That provides for compacting the distribution of the eggs in an intermediate storage region 21' between the two wall guide elements 21. In the entry region of the packaging station 20, the eggs must be introduced into guide passages 22a, 22b, etc. In those regions, a build-up and congestion or accumulation of eggs may occur by virtue of transversely disposed eggs, which can lead to further compacting of the egg distribution. That compacting effect can mean that the horizontal pressure between the eggs in the entry region upstream of the packaging station can become so great that hair cracks are produced in the eggshells, or the eggs are completely destroyed.

In order to detect such a situation before damage occurs, arranged laterally in the entry region are two pressure sensors 23a, 23b coupled to two half-round pressure pickup plates 24a, 24b. The pressure pickup plates 24a and 24b project into the flow of eggs and detect a superposed, horizontally acting force component in transverse relationship with the conveyor direction and in opposite relationship to the conveyor direction. In relation to the level of the force detected by the force sensors 23a, 24b, the conveyor speed of the transverse conveyor belt 10 is regulated. If the measured force rises, the transverse conveyor belt speed is reduced, while if the force falls, the transverse conveyor belt speed is increased.

Figure 4B:
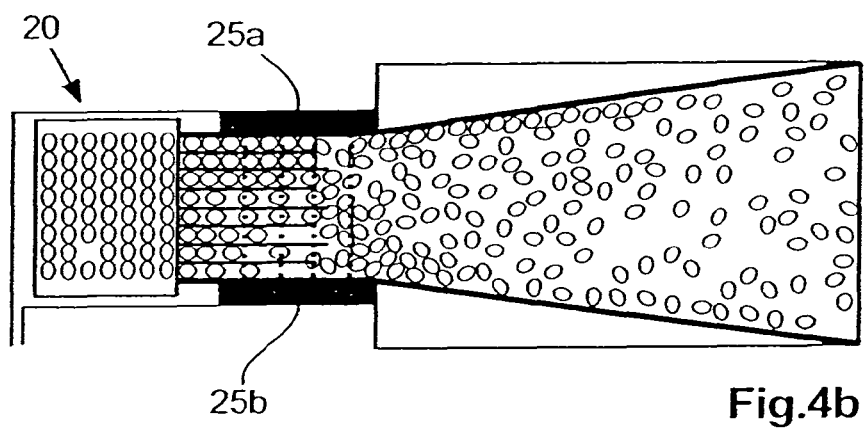
FIG. 4b shows a second embodiment as shown in FIG. 4a, FIG. 4c shows a third embodiment as shown in FIG. 4a, FIG. 5 shows a side view of a variant of the embodiments of FIGS. 4b and 4c.
Figure 5:
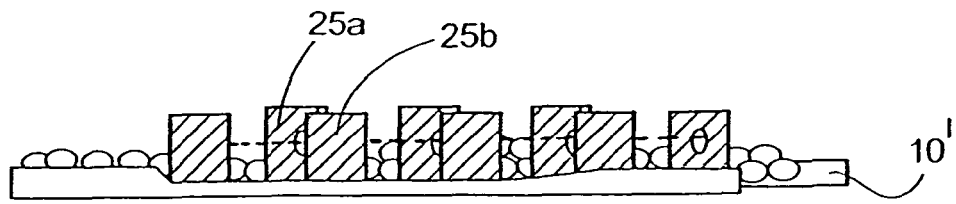

FIG. 4b shows an alternative to the arrangement of FIG. 4a. In the FIG. 4b arrangement, the force sensors 23a, 24b are replaced with light barrier devices 25a, 25b which pass transversely over the entry region of the packaging station 20. The light barrier devices are so oriented that they measure over the eggs which are lying flat on the bottom surface of the packaging station, as can be seen from FIG. 5. As soon as an egg stands up on end, or the eggs come to lie one upon the other, they break the light beam of the light barrier device 25a, 25b. The number of such detected eggs is a measurement which reflects the horizontal pressure between the eggs in the entry region, and can once again serve to regulate the transverse belt conveyor speed, as described hereinbefore.

Figure 4C:
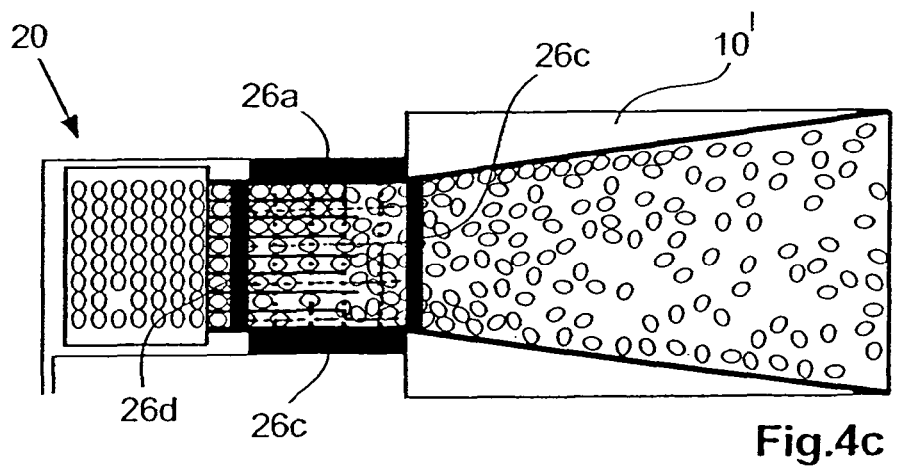

FIG. 4c shows a further variant of the embodiment with light barrier devices as shown in FIG. 4b. In FIG. 4c, there are a total of four light barrier elements 26a-26d which monitor the entry region of the packaging station 20 over the area thereof, and thus ensure more precise detection of eggs which are standing up or which are arranged one upon the other.

Figure 6:
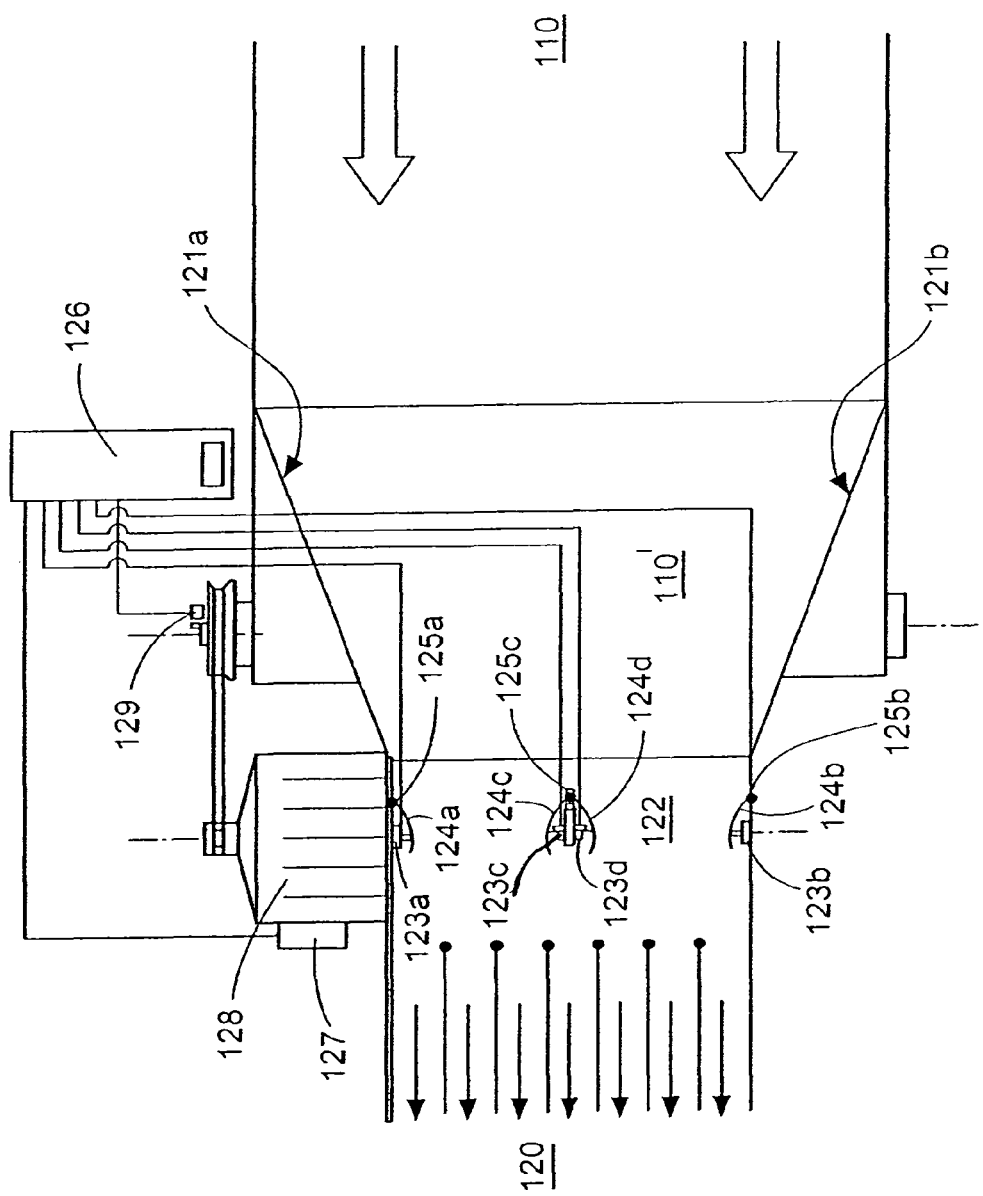
FIG. 6 shows a plan view of a fourth embodiment as shown in FIG. 4a with a transverse conveyor belt regulator.

FIG. 6 shows a variant of the embodiment of FIG. 4a with force sensors. The transverse conveyor belt 110 conveys the eggs by way of a funnel table 110' into a reaction region 122 in front of a packaging station 120. Side wall elements 121a, 121b guide the eggs together and compress the distribution thereof. Arranged at each of the side wall elements 121a, 121b is a respective pressure pickup 123a, 123b coupled to a half-round deflection and pressure pickup plate 124a, 124b. The pressure pickup plate 124a, 124b is respectively pivotably mounted in a hinge mounting 125a, 125b arranged on the side facing towards the conveyor direction and as a result can freely movably transmit a pressing force exerted by the eggs to the pressure pickup 123a, 123b.

Placed centrally in the reaction region 122, in the form of an island arrangement, are two further pressure sensors 123c, 123d which are again supported by means of two half-round pressure pickup plates 124c, 124d mounted pivotably in a common pivot mounting 125c in order to detect the horizontal egg pressure in the central region. The use of four pressure pickups at mutually spaced locations with a differing measurement direction ensures that even local compression phenomena, indicative of egg distribution with unacceptably high horizontal forces, are detected, and the transverse belt conveyor speed can be appropriately regulated.

The pressure pickups 123a-123d are connected to a central transverse conveyor belt control 126, coupled in turn to a frequency converter 127 for actuating the drive motor 128 for transverse belt conveyance.

A timing device 129 is also connected to the central control unit 126 and indicates the advance of the transverse conveyor belt.

Figure 7:
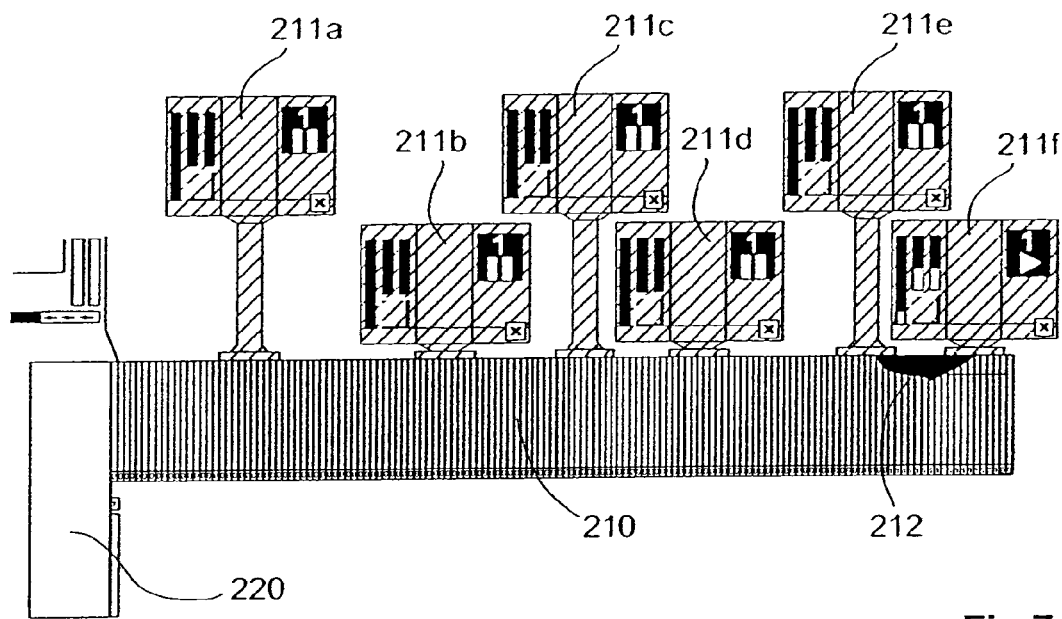
FIG. 7 shows a diagrammatic view of a visualization of the conveyor advance of a transverse conveyor belt in a start-up phase of the conveyor operation.

FIG. 7 shows an example of a display screen that provides visualization of the full utilization and advance of the transverse conveyor belt 210. The transverse conveyor belt 210 is divided into a plurality of transverse strips, each respective one of each represents a transverse conveyor belt length of 1 m.

Along the transverse conveyor belt 210, six longitudinal conveyor belts 211a-211f communicate at spaced locations with the transverse conveyor belt 210. The longitudinal conveyor belts are illustrated by box symbols 211a-211f in which are shown parameters relating to the conveyor properties of the longitudinal conveyor belt.

The left-hand end the transverse conveyor belt 210 leads to a packaging station 220.

FIG. 7 shows a conveyor arrangement state in which the collection operation from the longitudinal conveyor belts 211 was begun a short time ago. That is represented by black bars in the transverse conveyor belt regions downstream in the conveyor direction of the point of entry of the longitudinal conveyor belt 211f. The black bar region 212 symbolically represents the eggs deposited on the transverse conveyor belt 210. In addition, a hatched rectangular region in the region of the entry of the longitudinal conveyor belt 211f symbolically represents the transverse conveyor belt width allocated to the longitudinal conveyor belt 211f.

Figure 8:
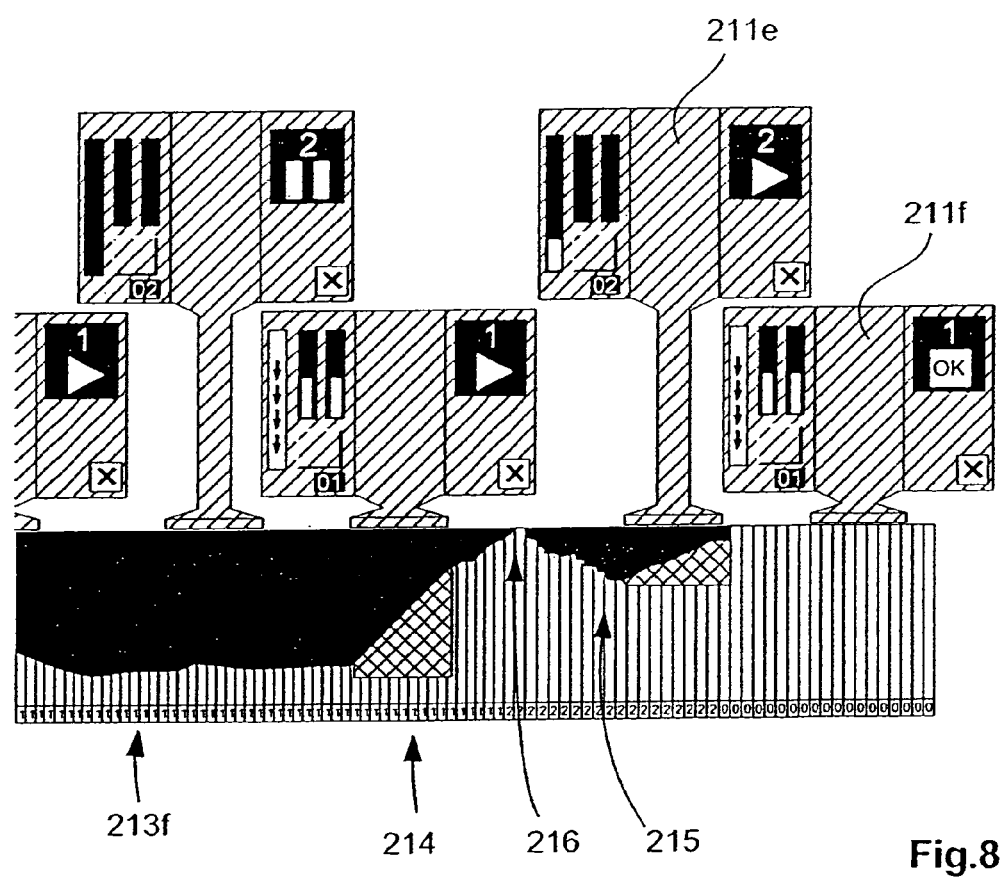
FIG. 8 shows a portion from FIG. 7 at a time of termination of the conveyor operation.

FIG. 8 shows the arrangement of FIG. 7 at a later time in the operation of transverse conveyor 123. In region 213f filled to a reference value, the transverse conveyor belt picks up eggs to a transverse conveyor belt capacity of 80 percent, which includes a safety margin in relation to utilization at full capacity. In the region 214, it is possible to see the discharge of the collection of the first group of eggs, which can be seen by virtue of the fact that the width of the transverse conveyor belt is utilized in a diagonally decreasing fashion. The first group, in the direction of conveyor travel, is followed by a second group of eggs, which is put onto the transverse conveyor belt by activation of the longitudinal conveyor belt 211e. A gap 216 is left between the group 213, 214, and the group 215, wherein the gap allows a short period of time for conversion of the packaging station 220.

Figure 9:
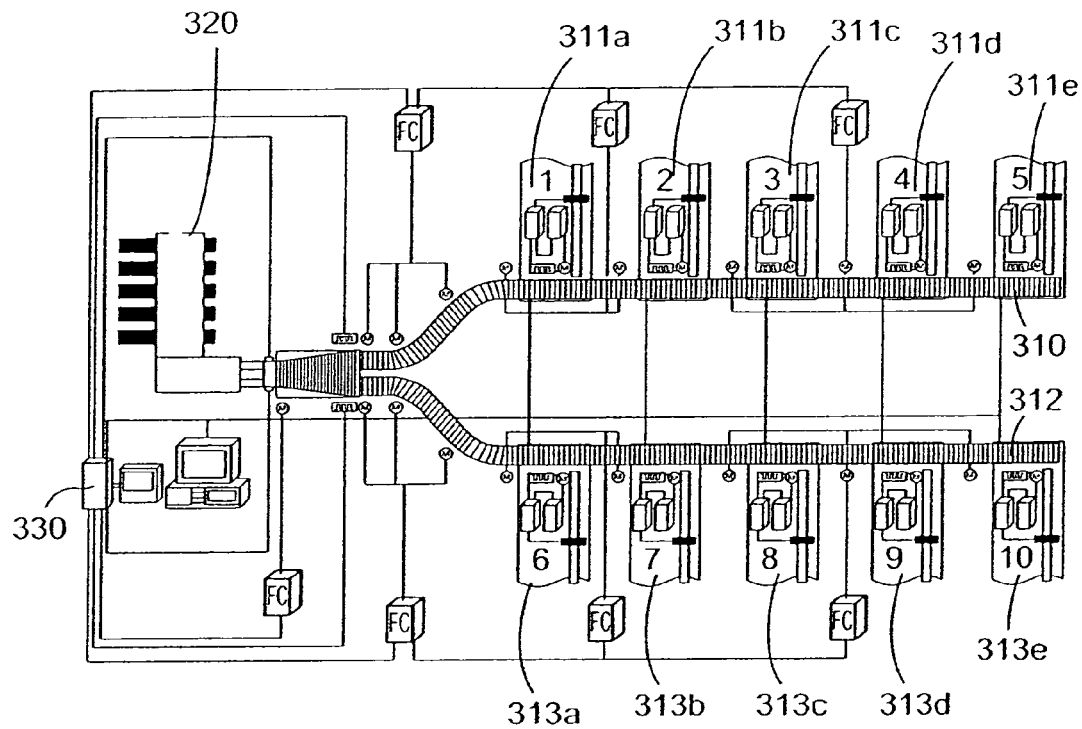
FIG. 9 shows a diagrammatic view of a further embodiment of the conveyor arrangement according to the invention with two transverse conveyor belts.
Figure 10:
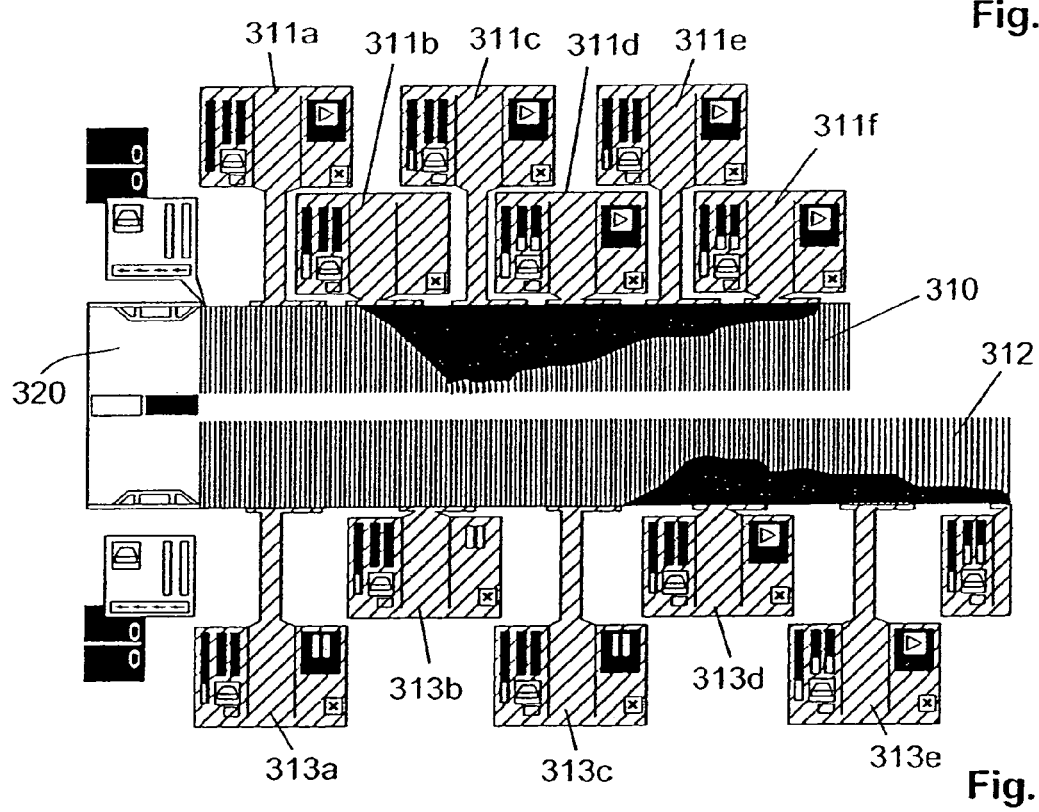
FIG. 10 shows a diagrammatic view of the visualization of the conveyor belt advance of the arrangement shown in FIG. 9.

FIG. 9 shows a diagrammatic plan view of a conveyor arrangement having two transverse conveyor belts 310, 312, and FIG. 10 shows a diagrammatic view of a display screen that provides visualization of that conveyor arrangement. As can be seen, arranged at each transverse conveyor belt 310, 312 are a plurality of longitudinal conveyor belts 311a-311e, 313a-313e, which lead onto the transverse conveyor belt 310 and 312, respectively, at spaced locations. Each longitudinal conveyor belt 311a-311e, 313a-313e has its own local control, which actuates the longitudinal conveyor belt as a function of a weighing sensor, as shown in FIG. 3, and at the command of a higher order central control system 330, which causes total emptying of the longitudinal conveyor belt onto the corresponding transverse conveyor belt.

Both transverse conveyor belts 310, 312 open to a packaging station 320.

As can be seen from FIG. 10, the eggs collected on the transverse conveyor belt are placed thereon in a locally displaced relationship from four activated longitudinal conveyors 331c-331f, and are fed in the form of an interconnected block corresponding to the capacity of the packaging station 320, to the packaging station 320. On the transverse conveyor belt 312, only the longitudinal conveyor belts 313d-331f are active, and it is only after a further advance of the transverse conveyor belt 312 that the further longitudinal conveyor belts 313a-313f are switched on.

Figure 11:
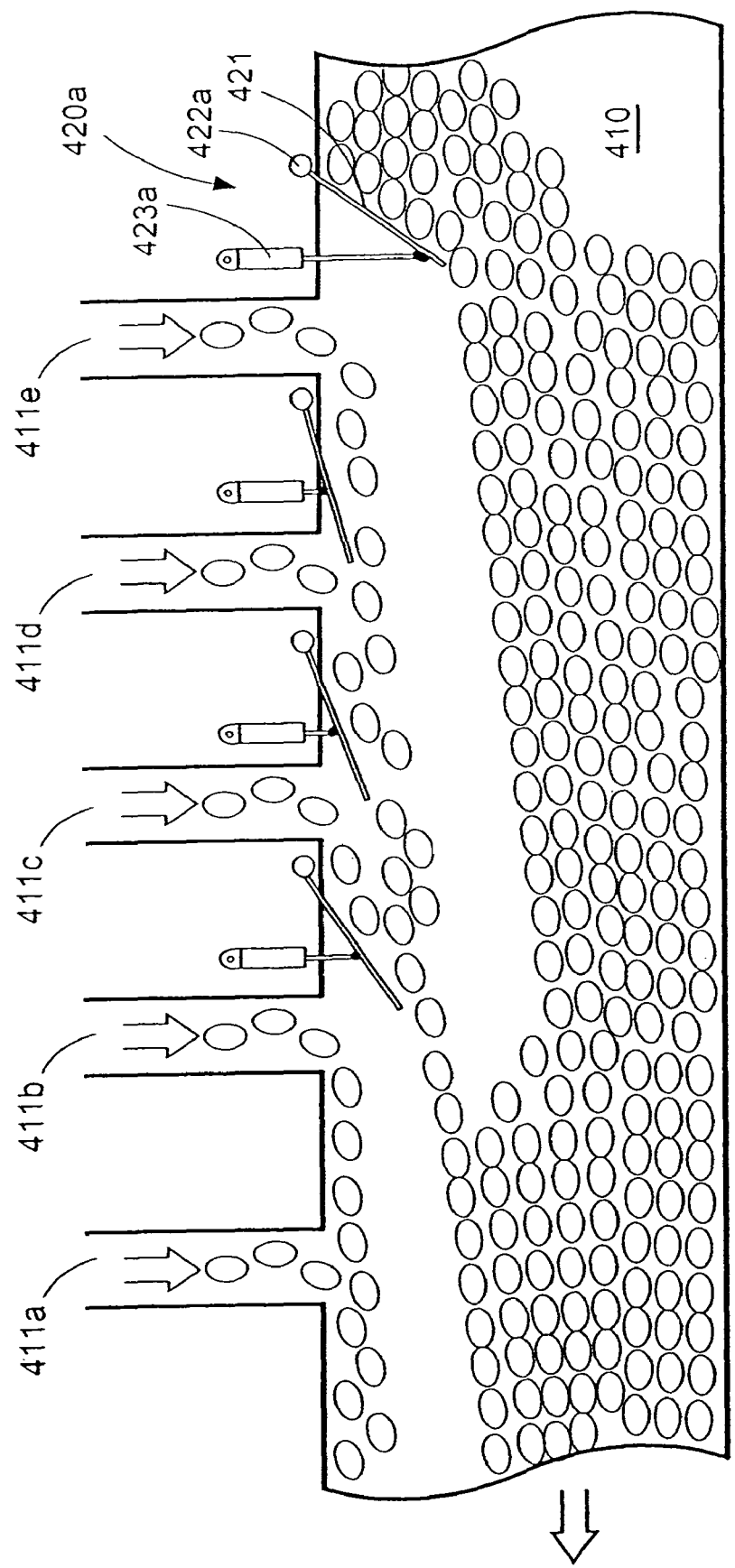
FIG. 11 shows a diagrammatic plan view of a portion of a transverse conveyor belt with five longitudinal conveyor belts entering the same and four controllable product guide devices.

FIG. 11 shows a portion of a transverse conveyor belt 410 with a plurality of longitudinal conveyor belts 411a-411e which connect with the transverse conveyor belt 410 at locations of entry of which are spaced from each other in the conveyor direction. A plurality of eggs, which are symbolically represented by circles on the conveyor belt, are conveyed on the transverse conveyor belt in the conveyor direction shown by the arrow.

As will be seen, the products pass into the illustrated portion of the transverse conveyor belt at the right-hand edge, as viewed in the direction of the transverse conveyor belt, and would therefore impede the feed of further eggs from the longitudinal conveyor belts 411a-411e, as they would first have to press the eggs, which are already on the transverse conveyor belt, in the direction of the left-hand edge, as seen in the direction of conveying movement of the transverse conveyor belt, with a considerable horizontal pressure. In that situation, the eggs can suffer damage.

Arranged upstream of longitudinal conveyor belt 411e in the conveyor direction of transverse conveyor belt 410 is an egg guide device 420a, which includes an egg guide plate 421a mounted pivotably in a laterally and stationarily supported pivot mounting 422a. The egg guide plate 421a can be pivoted into or out of the region above the transverse conveyor belt 410 by means of an actuator, which in this case, is an electrical linear drive 423a with position feedback signaling.

Arranged in a similar fashion and of a similar structure, between the longitudinal conveyor belts 411d and 411e, between the longitudinal conveyor belts 411c and 411d and between the longitudinal conveyor belts 411b and 411c, are respective egg guide devices 420b-420d, which are of the same structure as the egg guide device 420a.

In the illustrated conveyor condition, additional eggs are conveyed from the longitudinal conveyor belts 411a-411e to add to the eggs which are already on the transverse conveyor belt 410. In order to avoid damage to the additional eggs which are being supplied thereto, or the eggs which are already on the transverse conveyor belt, in that conveyor condition, the egg guide device 420a is pivoted into the region above the transverse conveyor belt 410 to such an extent that the eggs are deflected from the right-hand side to the left-hand side, so that space is provided for the eggs additionally arriving from the longitudinal conveyor belts 411a-411e. The egg guide devices 420b and 420c are not pivoted out.

The egg guide device 420d is pivoted out by a lesser amount than the egg guide device 420a in order to guide the eggs which are additionally arriving from the longitudinal conveyor belts 411d, 411e away from the right-hand edge of the transverse conveyor belt, and thus provide space for the eggs which are being added from the longitudinal conveyor belts 411a, 411b, without guiding the entire flow of eggs on the transverse conveyor belt excessively far in the direction of the left-hand edge of the transverse conveyor belt, as that would cause damage to the eggs which are already on the transverse conveyor belt 410.

The electrical linear drives 423a-423d and the position feedback signaling units of those drives of the egg guide devices 420a-420d are coupled to the central control system, and are actuated as a function of the number of eggs already on the transverse conveyor belt, their arrangement, and possibly the conveyor rate of the longitudinal conveyor belts which are additionally feeding eggs, and are extended to such an extent that neither damage to the deflected eggs nor damage to the eggs which are being added can occur.

The conveyor method according to the invention operates as follows.

At a time about three hours after the beginning of laying, the longitudinal conveyor belt 311f which is most remote from the packaging station is activated and conveys the eggs onto the transverse conveyor belt 310. The transverse conveyor belt 310 is also activated and conveys the eggs in the direction of the packaging station 320. As soon as the eggs moved onto the transverse conveyor belt 310 by the longitudinal conveyor belt 311f reach the point of entry of the longitudinal conveyor belt 311e, the longitudinal conveyor belt 311e is also activated and conveys the eggs onto the transverse conveyor belt 310. In that way, the eggs on the two longitudinal conveyor belts 311e, 311f are added to give a total transverse conveyor belt width. As soon as that region reaches the point of entry of the longitudinal conveyor belt 311d, longitudinal conveyor belt 311d is also activated, and so forth, until activation of the longitudinal conveyor belt 311a occurs. In that way, full utilization of capacity is achieved over the full width of the transverse conveyor belt, and at the beginning of the work done by the packers at the packaging station 320, the transverse conveyor belt is completely filled, and the eggs are positioned just upstream of the packaging station 320.

The eggs supplied by each longitudinal conveyor belt are counted in the region of the mouth opening of the respective longitudinal conveyor belts to provide a check concerning the laying output of the respective henhouse or the respective rows of aviaries. Furthermore, the egg counting operation makes it possible to precisely determine the eggs disposed on the transverse conveyor belt. As soon as it is recognized that a longitudinal conveyor belt contains a very high number of eggs, for example by a high number of eggs already being counted with a short advance movement of the longitudinal conveyor belt, a greater transverse conveyor belt width is allocated to that longitudinal conveyor belt, and a correspondingly reduced width is allocated to the other longitudinal conveyor belts. This ensures that even the longitudinal conveyor belt which is filled to an above-average extent is emptied within a period of time in which the other longitudinal conveyor belts are also emptied. This dynamic regulation can possibly be further adapted if other longitudinal conveyor belts emerge as being emptied belatedly or prematurely.

The method according to the invention is the first to make it possible to provide for automatic regulation and full utilization of the capacity of the packaging station as a function of the eggs supplied by the individual longitudinal conveyor belts and the individual spacing thereof from the packaging station, as well as the respective currently prevailing transverse conveyor belt advance.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A conveyor for transporting shock-sensitive products comprising:
    a conveyor member adapted to receive and support shock-sensitive products thereon having a static condition, as well as a dynamic condition during which the shock-sensitive products thereon are transported toward a processing station;
    at least one intermediate storage region of said conveyor member adapted to receive and support a predetermined critical number of the shock-sensitive products placed thereon when said conveyor is in said static condition for temporary, intermediate storage of the shock-sensitive products;
    a control member adapted for increasing and decreasing the rate of feed of the shock-sensitive products on said conveyor member toward and away from said intermediate storage region when the number of the shock-sensitive products in said intermediate storage region exceeds said predetermined critical number;
    a force measuring member adapted and arranged to detect and measure the weight force exerted by the shock-sensitive products disposed in said intermediate storage region of said conveyor member as an indication of the number of shock-sensitive products in said intermediate storage region;
    and wherein said control member is adapted to process said weight force detected by said force measuring member as an input parameter, and increase or reduce said rate of feed of the shock-sensitive products on said conveyor member toward and away from said intermediate storage region as a function of said weight force; and
    said control member is adapted to adjust said conveyor member steplessly as a function of the force detected by said force measuring member.

2. A conveyor as set forth in claim 1, wherein:
said control member is adapted to reduce the feed of shock-sensitive products to said intermediate storage region and increase the feed of shock-sensitive products removed from said intermediate storage region when a predetermined force value detected by said force measuring member is exceeded.

3. A conveyor as set forth in claim 1, wherein:
said force measuring member is disposed beneath the shock-sensitive products in said intermediate storage region to measure the weight force in a vertical direction, and to detect the combined weight force of the shock-sensitive products in said intermediate storage region.

4. A conveyor as set forth in claim 2, wherein:
said force measuring member is coupled to a horizontally arranged weighing plate disposed beneath said conveyor member on which the shock-sensitive products are arranged at said intermediate storage region.

5. A conveyor as set forth in claim 3, wherein:
said control member is adapted to actuate said conveyor member from said static condition when a predetermined cumulative weight force from the shock-sensitive products in said intermediate storage region is exceeded, so that the shock-sensitive products are conveyed on said conveyor member out of said intermediate storage region.

6. A conveyor for transporting shock-sensitive products comprising:
    a conveyor member adapted to receive and support shock-sensitive products thereon having a static condition, as well as a dynamic condition during which the shock-sensitive products thereon are transported toward a processing station;
    at least one intermediate storage region of said conveyor member adapted to receive and support a predetermined critical number of the shock-sensitive products placed thereon when said conveyor is in said static condition for temporary, intermediate storage of the shock-sensitive products;
    a control member adapted for increasing and decreasing the rate of feed of the shock-sensitive products on said conveyor member toward and away from said intermediate storage region when the number of the shock-sensitive products in said intermediate storage region exceeds said predetermined critical number;
    a force measuring member adapted and arranged to detect and measure the weight force exerted by the shock-sensitive products disposed in said intermediate storage region of said conveyor member as an indication of the number of shock-sensitive products in said intermediate storage region;
    and wherein said control member is adapted to process said weight force detected by said force measuring member as an input parameter, and increase or reduce said rate of feed of the shock-sensitive products on said conveyor member toward and away from said intermediate storage region as a function of said weight force, wherein:
    said force measuring member is disposed beneath the shock-sensitive products in said intermediate storage region to measure the weight force in a vertical direction, and to detect the combined weight force of the shock-sensitive products in said intermediate storage region;
    said conveyor member includes a conveyor belt on which said intermediate storage region extends by a given length; and
    said control member is adapted such that said conveyor belt is further conveyed by precisely the length of said intermediate storage region when the combined force of said predetermined critical number of shock-sensitive products in said intermediate storage region is exceeded.

7. A conveyor as set forth in claim 3, wherein:
a plurality of said intermediate storage regions are arranged in a mutually spaced apart relationship along said conveyor member; and
said control member is so adapted that when a predetermined cumulative force caused by the weight of said shock-sensitive products in said intermediate storage region is first exceeded, said conveyor member is further conveyed by a length equal to the length of said intermediate storage region, and when a predetermined cumulative force due to the weight of the shock-sensitive products is subsequently exceeded in said intermediate storage region, said conveyor member is conveyed again by a length equal to the length of said intermediate storage region, which procedure is repeated up to a predetermined number of repetitions until the conveyor member is substantially fully occupied with the shock-sensitive products, at which point all of the shock-sensitive products on said conveyor member are transported toward the processing station.

8. A conveyor as set forth in claim 6, including:
a plurality of said conveyor belts, each having at least one of said intermediate storage regions;
at least one of said intermediate storage regions includes said force measuring member to measure the weight force of the shock-sensitive products in said intermediate storage region; and wherein
said control member is so adapted that each of said conveyor belts is further conveyed by a length equal to the length of said intermediate storage region when a predetermined cumulative force due to the weight of the shock-sensitive products in said intermediate storage region is exceeded.

9. A conveyor as set forth in claim 6, wherein:
said conveyor member includes a plurality of said conveyor belts, each having at least one of said intermediate storage regions, each of which includes one of said force measuring members; and wherein
said control member is adapted such that all of said conveyor belts are further conveyed by a length equal to the length of said intermediate storage regions when the force weight of the shock-sensitive products in one of said intermediate storage regions is detected by said associated force measuring member, or the mean value of the weight force of the weight of the shock-sensitive products in all of said intermediate storage regions exceeds a predetermined value.

10. A conveyor for transporting shock-sensitive products comprising:
a conveyor member adapted to receive and support shock-sensitive products thereon having a static condition, as well as a dynamic condition during which the shock-sensitive products thereon are transported toward a processing station;
at least one intermediate storage region of said conveyor member adapted to receive and support a predetermined critical number of the shock-sensitive products placed thereon when said conveyor is in said static condition for temporary, intermediate storage of the shock-sensitive products;
a control member adapted for increasing and decreasing the rate of feed of the shock-sensitive products on said conveyor member toward and away from said intermediate storage region when the number of the shock-sensitive products in said intermediate storage region exceeds said predetermined critical number;
a force measuring member adapted and arranged to detect and measure the weight force exerted by the shock-sensitive products disposed in said intermediate storage region of said conveyor member as an indication of the number of shock-sensitive products in said intermediate storage region; and wherein
said control member is adapted to process said weight force detected by said force measuring member as an input parameter, and increase or reduce said rate of feed of the shock-sensitive products on said conveyor member toward and away from said intermediate storage region as a function of said weight force;
said force measuring member is arranged and adapted to measure in a horizontal direction a horizontal pressing force which exists between the shock-sensitive products in said intermediate storage region; and
said force measuring member is coupled with a movable wall portion to detect the horizontal surface pressure exerted by the shock-sensitive products on said movable wall portion.

11. A conveyor as set forth in claim 10, wherein:
said movable wall portion faces in an opposite direction of said conveyor member in said intermediate storage region, and includes a second wall surface region which faces parallel to said conveyor member in said intermediate storage region.

12. A conveyor as set forth in claim 10, wherein:
said movable wall portion has a half-round shape.

13. A conveyor for transporting shock-sensitive products comprising:
a conveyor member adapted to receive and support shock-sensitive products thereon having a static condition, as well as a dynamic condition during which the shock-sensitive products thereon are transported toward a processing station;
at least one intermediate storage region of said conveyor member adapted to receive and support a predetermined critical number of the shock-sensitive products placed thereon when said conveyor is in said static condition for temporary, intermediate storage of the shock-sensitive products;
a control member adapted for increasing and decreasing the rate of feed of the shock-sensitive products on said conveyor member toward and away from said intermediate storage region when the number of the shock-sensitive products in said intermediate storage region exceeds said predetermined critical number;
a force measuring member adapted and arranged to detect and measure the weight force exerted by the shock-sensitive products disposed in said intermediate storage region of said conveyor member as an indication of the number of shock-sensitive products in said intermediate storage region;
and wherein said control member is adapted to process said weight force detected by said force measuring member as an input parameter, and increase or reduce said rate of feed of the shock-sensitive products on said conveyor member toward and away from said intermediate storage region as a function of said weight force, further including:
a second conveyor member adapted to receive and support shock-sensitive products thereon;
a second intermediate storage region of said second conveyor member adapted to receive and support the shock-sensitive products thereon and store the same temporarily in said second intermediate storage region upon discontinuous feed or discharge of the shock-sensitive products;

a second control device for increasing and/or reducing the feed of products into said second intermediate storage region of said second conveyor member when a predetermined critical number of shock-sensitive products in said second intermediate storage region is exceeded;

a second measuring device disposed in said second intermediate storage region which is adapted or arranged to detect the number of shock-sensitive products standing up in said second intermediate storage region, and which measures the horizontal force between the shock-sensitive products in said second intermediate storage region; and wherein said second control member is adapted to process the data detected by said second measuring member as an input parameter, and increase or decrease the rate of feed of the shock-sensitive products on said second conveyor member toward and away from said second intermediate storage region as a function thereof;

said second intermediate storage region is disposed in a transfer region between a first feeding conveyor apparatus and a second discharging conveyor apparatus;

said second control member is adapted such that when a predetermined pressing force between the shock-sensitive products, or the number of shock-sensitive products standing up in said second intermediate storage region, is exceeded, the conveyor rate of said second conveyor member is reduced and/or the conveyor rate of the discharging conveyor apparatus is increased; and wherein the conveyor rate of at least one of said conveyor members can be altered in a stepless fashion.

14. A conveyor for transporting shock-sensitive products comprising:

a conveyor member adapted to receive and support shock-sensitive products thereon having a static condition, as well as a dynamic condition during which the shock-sensitive products thereon are transported toward a processing station;

at least one intermediate storage region of said conveyor member adapted to receive and support a predetermined critical number of the shock-sensitive products placed thereon when said conveyor is in said static condition for temporary, intermediate storage of the shock-sensitive products;

a control member adapted for increasing and decreasing the rate of feed of the shock-sensitive products on said conveyor member toward and away from said intermediate storage region when the number of the shock-sensitive products in said intermediate storage region exceeds said predetermined critical number;

a force measuring member adapted and arranged to detect and measure the weight force exerted by the shock-sensitive products disposed in said intermediate storage region of said conveyor member as an indication of the number of shock-sensitive products in said intermediate storage region;

and wherein said control member is adapted to process said weight force detected by said force measuring member as an input parameter, and increase or reduce said rate of feed of the shock-sensitive products on said conveyor member toward and away from said intermediate storage region as a function of said weight force, including:

a transverse conveyor belt which conveys the shock-sensitive products to a processing station; and wherein said conveyor member comprises a plurality of longitudinal conveyor belts which are arranged such that they convey the shock-sensitive products onto said transverse conveyor belt at various, mutually spaced locations, and includes a device for detecting the conveyor advance of said transverse conveyor belt in a regulating device which is coupled to said device and which is adapted at the beginning of conveyor operation to set said longitudinal conveyor belts in operation in a time-displaced relationship as a function of the spacing between the entry point thereof onto said transverse conveyor belt and the processing station and as a function of the conveyor advance of said transverse conveyor belt.

15. A conveyor as set forth in claim 14, wherein:

said regulating device is adapted to first set in operation a first one of said longitudinal conveyor belts which is most remote from the processing station, and to set into operation a second longitudinal one of said conveyor belts arranged closer to the processing station at the time at which said transverse conveyor belt has advanced to such an extent that the shock-sensitive products delivered by said first longitudinal conveyor belt have reached the entry region of said second longitudinal conveyor belt.

16. A conveyor as set forth in claim 15, wherein:

said longitudinal conveyor belts define at least first and second groups; and said regulating device is adapted to arrange the shock-sensitive products on said longitudinal conveyor belts of said first group on said transverse conveyor belt before the shock-sensitive products of said longitudinal conveyor belts of said second group.

17. A conveyor as set forth in claim 16, wherein:

said regulating device is adapted to actuate the first in each group of said longitudinal conveyor belts remote from the processing station.

18. A conveyor as set forth in claim 17, wherein:

said regulating device is adapted to actuate said longitudinal conveyor belts most remote from the processing station as the last group.

19. A conveyor set forth in claim 16, wherein:

said regulating device is adapted to determine the moment of stopping of the last one of said longitudinal conveyor belts of a group, and actuate the first one of said longitudinal conveyor belts of a subsequent group as a function of the spacing between the point of entry of said last longitudinal conveyor belt, and said first longitudinal conveyor belt along said transverse conveyor belt, and said transverse conveyor belt is advanced.

20. A conveyor as set forth in claim 19, wherein:

said regulating device is adapted to stop said longitudinal conveyor belts and said transverse conveyor belt when the last shock-sensitive product of a group has been conveyed into the processing station.

21. A conveyor as set forth in claim 20, wherein:

said regulating device is adapted to determine the number of times that the last shock-sensitive products of said last longitudinal conveyor belt of said first group and the first shock-sensitive product of said first longitudinal conveyor belt of said second group are deposited on said transverse conveyor belt in a joint mixed region.

22. A conveyor as set forth in claim 20, wherein:

said regulating device is adapted to determine the number of times that an intermediate space is produced on said transverse conveyor belt between the shock-sensitive products of said first group of said longitudinal conveyor belts and the shock-sensitive products of said second group of said longitudinal conveyor belts.

23. A conveyor as set forth in claim 22, wherein:
said regulating device is adapted to actuate so many of said longitudinal conveyor belts and/or to regulate the conveyor speed of the activated ones of said longitudinal conveyor belts in such a way that enough of the shock-sensitive products are fed to each region of said transverse conveyor belt that a predetermined capacity of the processing station is achieved.

24. A conveyor as set forth in claim 23, wherein:
said regulating device is adapted to allocate a fraction of said transverse conveyor belt width to each activated one of said longitudinal conveyor belts and to regulate the conveyor speed of each of said longitudinal conveyor belts in such a way that the respective allocated width of said transverse conveyor belt is filled up with the shock-sensitive products by the respective one of said longitudinal conveyor belts.

25. A conveyor as set forth in claim 24, wherein:
each of said longitudinal conveyor belts pre-stores a given number of the shock-sensitive products, and said regulating device is coupled to sensors for detecting the shock-sensitive products still stored on each of said longitudinal conveyor belts and is adapted to allocate to the one of said longitudinal conveyor belts with fewer shock-sensitive products thereon a smaller fraction of said transverse conveyor belt width than is allocated to those ones of said longitudinal conveyor belts with more of the shock-sensitive products thereon such that emptying of all of said longitudinal conveyor belts is finished at the same time or in a predetermined time-displaced relationship.

26. A conveyor as set forth in claim 25, wherein:
said regulating device is coupled to said force measuring member at an exit region of said transverse conveyor belt or at a counting sensor and is adapted to regulate the conveyor speed of said transverse conveyor belt as a function of the sensor signal.

27. A conveyor as set forth in claim 26, including:
a display device coupled to said regulating device to obtain from said regulating device signals for positively identifying the number of shock-sensitive products on said transverse conveyor belt.

28. A conveyor as set forth in claim 27, including:
product counting devices in the entry region of said longitudinal conveyor belts, which detect the number of shock-sensitive products fed to said transverse conveyor belt and communicate the same to a central control.

29. A conveyor as set forth in claim 28, including:
at least one movable product guide arranged above said transverse conveyor belt and coupled to an actuator adapted to move said product guide into at least two positions in the support region of said transverse conveyor belt; and wherein
said product guide is laterally spaced on said transverse conveyor belt in such a way that it guides the shock-sensitive products on said transverse conveyor belt away from the entry region of at least one of said longitudinal conveyor belts.

30. A conveyor as set forth in claim 29, including:
a plurality of said movable product guides which are respectively arranged upstream of the entry regions of a plurality of said longitudinal conveyor belts in the conveyor direction of said transverse conveyor belt.

31. A conveyor as set forth in claim 30, wherein:
said actuator of each of said product guides is coupled to a central control device, and is actuated as a function of the degree of filling said transverse conveyor belt that is calculated by said control device from supplied shock-sensitive products and transverse belt advance upstream of the respective product guide in order to guide the shock-sensitive products from the entry region of said longitudinal conveyor belts to the degree permitted.

32. A conveyor as set forth in claim 31, wherein:
said actuators of each of said product guides are actuated as a function of a groupwise collection of the shock-sensitive products.

33. A conveyor for transporting shock-sensitive products comprising:
a conveyor member adapted to receive and support shock-sensitive products thereon having a static condition, as well as a dynamic condition during which the shock-sensitive products thereon are transported toward a processing station;
at least one intermediate storage region of said conveyor member adapted to receive and support a predetermined critical number of the shock-sensitive products placed thereon when said conveyor is in said static condition for temporary, intermediate storage of the shock-sensitive products;
a control member adapted for increasing and decreasing the rate of feed of the shock-sensitive products on said conveyor member toward and away from said intermediate storage region when the number of the shock-sensitive products in said intermediate storage region exceeds said predetermined critical number;
a force measuring member adapted and arranged to detect and measure the weight force exerted by the shock-sensitive products disposed in said intermediate storage region of said conveyor member as an indication of the number of shock-sensitive products in said intermediate storage region; and wherein
said control member is adapted to process said weight force detected by said force measuring member as an input parameter, and increase or reduce said rate of feed of the shock-sensitive products on said conveyor member toward and away from said intermediate storage region as a function of said weight force;
said force measuring member is disposed beneath the shock-sensitive products in said intermediate storage region to measure the weight force in a vertical direction and to detect the combined weight force of the shock-sensitive products in said intermediate storage region; and
said intermediate storage regions arranged so that they receive eggs laid in nest regions in cages arranged in a row along said conveyor member.

34. A conveyor as set forth in claim 10, wherein:
said intermediate storage region of said transverse conveyor belt is disposed upstream of a packaging apparatus.

35. A method of conveying eggs adjacent a henhouse comprising a plurality of cage units, comprising:
a. temporarily storing the eggs laid in a first nest region of a cage or in a first cage on a first intermediate storage region of a stationary conveyor belt;
b. measuring the total force due to the weight of the eggs in the first intermediate storage region;

c. conveying of the conveyor belt by a predetermined distance which is such that a conveyor belt portion which is not occupied with eggs is provided as a first intermediate storage region;

d. repeating of steps a to c up to a time at which further conveyance of the conveyor belt by the predetermined distance would provide a conveyor belt portion already occupied with eggs due to an adjacent second intermediate storage region of a nest region of an adjacent second cage or a second cage, as the first intermediate storage region; and e. further conveying of the conveyor belt until the eggs deposited thereon have been transferred completely onto a second conveyor belt or into a storage means.

36. A method as set forth in claim 35, comprising:
conveying the products on a transverse conveyor belt to a processing station;
delivering products by a plurality of longitudinal conveyor belts onto the transverse conveyor belt at various, mutually spaced locations; and wherein
the conveyor advance of the transverse conveyor belt is detected, and at the beginning of the conveyor operation, the longitudinal conveyor belts are set in operation in a time-displaced relationship as a function of the spacing between their point of entry onto the transverse conveyor belt and the processing station, and the conveyor advance of the transverse conveyor belt.

37. A method as set forth in claim 36, wherein:
the first longitudinal conveyor belt most remote from the processing station is set in operation first, and a second conveyor belt arranged closer to the processing station is set in operation at the time at which the transverse conveyor belt has advanced to such an extent that the products conveyed by the first longitudinal conveyor belt have reached the entry region of the second longitudinal conveyor belt.

38. A method as set forth in claim 37, wherein:
before the beginning of the conveyor operation, at least two groups of longitudinal conveyor belts are defined, and the longitudinal conveyor belts of the first group are activated first, and the longitudinal conveyor belts of the second group are activated subsequently.

39. A method as set forth in claim 38, wherein:
in each group, the longitudinal conveyor belt furthest away from the processing station is activated first.

40. A method as set forth in claim 39, wherein:
the longitudinal conveyor belts of the group with the longitudinal conveyor belt furthest away from the processing station are activated as the last group.

41. A method as set forth in claim 40, wherein:
the time of stopping the last longitudinal conveyor belt of a group and activating the first longitudinal conveyor belt of a subsequent group is determined as a function of the spacing between the point of entry of the last longitudinal conveyor belt and the first longitudinal conveyor belt to the transverse conveyor belt, and the transverse conveyor belt advance.

42. A method as set forth in claim 41, wherein:
the longitudinal conveyor belts and the transverse conveyor belt are stopped when the last product of a group has been conveyed into a processing apparatus.

43. A method as set forth in claim 42, wherein:
the last product of the last longitudinal conveyor belt of the first group and the first products of the first longitudinal conveyor belt of the second group are deposited in a common mixed region on the transverse conveyor belt.

44. A method as set forth in claim 42, wherein:
an intermediate space is provided on the transverse conveyor belt between the products of the first group of longitudinal conveyor belts and the products of the second group of longitudinal conveyor belts.

45. A method as set forth in claim 44, wherein:
so many longitudinal conveyor belts are activated and/or the conveyor speed of the activated longitudinal conveyor belts is regulated such that so many products are fed to each region of the transverse conveyor belt that a predetermined capacity of the processing station is attained.

46. A method as set forth in claim 45, wherein:
a function of the transverse conveyor belt width is allocated to each activated longitudinal conveyor belt and the conveyor speed of each longitudinal conveyor belt is so regulated that the respectively allocated width of the transverse conveyor belt is filled with products by the respective longitudinal conveyor belt.

47. A method as set forth in claim 46, wherein:
each longitudinal conveyor belt pre-stores a given number of products and the products still stored on each longitudinal conveyor belt are detected by means of sensors and a smaller fraction of the transverse conveyor belt width is allocated to a longitudinal conveyor belt with fewer products than to a longitudinal conveyor belt with more products in order to achieve termination of emptying of all longitudinal conveyor belts at the same time or in time-displaced relationship by a given amount.

48. A method as set forth in claim 47, wherein:
a force sensor arranged at the discharge region of the transverse conveyor belt measures the pressing force prevailing horizontally between the products in the discharge region and the conveyor speed of the transverse conveyor belt is regulated in dependence on the force sensor signal.

49. A method as set forth in claim 48, wherein:
the conveyor speed of the transverse conveyor belt is reduced if the measured pressing force exceeds a predetermined value.

50. A method as set forth in claim 49, wherein:
the conveyor speed of the transverse conveyor belt is increased if the measured pressing force falls below a predetermined value.

51. A method as set forth in claim 50, wherein:
the conveyor speed of the longitudinal conveyor belts and/or the transverse conveyor belt is steplessly altered.

52. A method as set forth in claim 51, wherein:
a processing start time is input and activation and conveyor speed of the longitudinal conveyor belts and the transverse conveyor belt are started at a time ascertained in dependence of the spacing between the longitudinal conveyor belt entry onto the transverse conveyor belt and the transverse conveyor belt advance in order to feed products to the processing station in a predetermined capacity at the start time of the processing station.

53. A method as set forth in claim 52, including:
programming a computer program for execution on a computer for controlling the actuation and speed of the conveyor belt.

54. A conveyor as set forth in claim 1, including;
a computer member communicating with said control member and said force measuring member, and programmed to control the activation and speed of said conveyor member.

* * * * *